United States Patent
Snell

(10) Patent No.: US 10,282,461 B2
(45) Date of Patent: May 7, 2019

(54) STRUCTURE-BASED ENTITY ANALYSIS

(71) Applicant: nCino, Inc., Wilmington, NC (US)

(72) Inventor: Nathan Snell, Wilmington, NC (US)

(73) Assignee: nCino, Inc., Wilmington, NC (US)

( * ) Notice: Subject to any disclaimer, the term of this patent is extended or adjusted under 35 U.S.C. 154(b) by 0 days.

(21) Appl. No.: 15/201,281

(22) Filed: Jul. 1, 2016

(65) Prior Publication Data

US 2017/0004201 A1 Jan. 5, 2017

Related U.S. Application Data

(60) Provisional application No. 62/187,487, filed on Jul. 1, 2015.

(51) Int. Cl.
*G06F 17/30* (2006.01)

(52) U.S. Cl.
CPC .. *G06F 17/30598* (2013.01); *G06F 17/30448* (2013.01); *G06F 17/30554* (2013.01)

(58) Field of Classification Search
CPC .......................... G06Q 40/06; G06F 17/30525
See application file for complete search history.

(56) References Cited

U.S. PATENT DOCUMENTS

| | | | |
|---|---|---|---|
| 5,630,069 A | 5/1997 | Flores et al. | |
| 6,029,149 A | 2/2000 | Dykstra et al. | |
| 6,088,686 A * | 7/2000 | Walker .................. | G06Q 20/10 235/375 |
| 6,105,007 A | 8/2000 | Norris | |
| 6,112,190 A | 8/2000 | Fletcher et al. | |
| 6,128,602 A | 10/2000 | Northington et al. | |
| 6,292,811 B1 | 9/2001 | Clancey et al. | |
| 6,505,176 B2 | 1/2003 | DeFrancesco, Jr. et al. | |
| 7,212,995 B2 | 5/2007 | Schulkins | |
| 7,379,913 B2 | 5/2008 | Steele et al. | |
| 7,392,222 B1 | 6/2008 | Hamilton et al. | |
| 7,415,471 B1 | 8/2008 | Coleman | |
| 7,415,741 B1 | 8/2008 | Wasley et al. | |
| 7,451,134 B2 | 11/2008 | Krakowiecki et al. | |
| 7,472,089 B2 | 12/2008 | Hu et al. | |
| 7,490,059 B2 | 2/2009 | Albee et al. | |
| 7,548,884 B1 | 6/2009 | Thomas | |
| 7,712,023 B1 | 5/2010 | Bryan | |

(Continued)

OTHER PUBLICATIONS

Unknown, "Relationship Groups Overview", Sales Force, accessed on Jul. 18, 2016, retrived from the internet: https://help.salesforce.com/HTViewHelpDoc?id=relgroups_about.htm&language=en_US, 3 pages.

(Continued)

*Primary Examiner* — Etienne P Leroux
*Assistant Examiner* — Farhad Agharahimi
(74) *Attorney, Agent, or Firm* — Kilpatrick Townsend & Stockton LLP

(57) ABSTRACT

Techniques described herein include a system, method, and computer-readable medium for providing networked-grouping data processing when concurrently processing a resource request. Upon receiving a resource request, a networked-grouping related to the resource request is identified, and the attributes of the networked-grouping are analyzed to further decide to fulfill the resource request. Clusters of networked-groupings are also used to identify resource targets.

17 Claims, 19 Drawing Sheets

(56) References Cited

U.S. PATENT DOCUMENTS

| | | | |
|---|---|---|---|
| 7,720,730 B2 | 5/2010 | Wiryawan et al. |
| 7,765,136 B2 | 7/2010 | Northington et al. |
| 7,822,680 B1 | 10/2010 | Weber et al. |
| 7,949,937 B2 | 5/2011 | Wu |
| 7,962,517 B2 | 6/2011 | Tritt et al. |
| 7,966,253 B2 | 6/2011 | Casper et al. |
| 7,979,297 B1 | 7/2011 | Shivananda et al. |
| 8,117,117 B2 | 2/2012 | Hu et al. |
| 8,126,920 B2 | 2/2012 | Hu et al. |
| 8,140,572 B1 | 3/2012 | Ballard et al. |
| 8,160,955 B2 | 4/2012 | Wiryawan et al. |
| 8,176,004 B2 | 5/2012 | Malaney et al. |
| 8,254,317 B2 | 8/2012 | Gu et al. |
| 8,255,304 B1 | 8/2012 | Lorenzo |
| 8,364,579 B2 | 1/2013 | Hu et al. |
| 8,433,650 B1 | 4/2013 | Thomas |
| 8,489,498 B1 | 7/2013 | Flaxman et al. |
| 8,510,332 B2 | 8/2013 | Ballard et al. |
| 8,566,125 B1 | 10/2013 | Perry et al. |
| 8,571,974 B1 | 10/2013 | Coleman |
| 8,572,083 B1 | 10/2013 | Snell et al. |
| 8,676,689 B1 | 3/2014 | Whelan |
| 8,694,355 B2 | 4/2014 | Bui et al. |
| 8,762,376 B2 | 6/2014 | Snell et al. |
| 9,082,151 B2 | 7/2015 | Snell et al. |
| 9,098,875 B2 | 8/2015 | Snell et al. |
| 9,268,819 B1* | 2/2016 | Snell | G06F 17/30657 |
| 9,418,116 B2 | 8/2016 | Snell et al. |
| 9,471,665 B2 | 10/2016 | Snell |
| 9,530,164 B2 | 12/2016 | Snell et al. |
| 9,619,840 B2 | 4/2017 | Snell |
| 2002/0007332 A1 | 1/2002 | Johnson et al. |
| 2002/0049841 A1* | 4/2002 | Johnson | H04L 67/10 |
| | | | 709/225 |
| 2002/0059137 A1 | 5/2002 | Freeman et al. |
| 2003/0036994 A1 | 2/2003 | Witzig et al. |
| 2003/0055668 A1 | 3/2003 | Saran et al. |
| 2003/0145018 A1 | 7/2003 | Hitchcock et al. |
| 2003/0185368 A1* | 10/2003 | Bradfield | H04L 67/16 |
| | | | 379/201.03 |
| 2003/0208412 A1* | 11/2003 | Hillestad | G06Q 30/0601 |
| | | | 705/26.1 |
| 2003/0220867 A1 | 11/2003 | Goodwin et al. |
| 2003/0220879 A1 | 11/2003 | Gaughan et al. |
| 2004/0003347 A1 | 1/2004 | Saidenberg et al. |
| 2004/0030649 A1 | 2/2004 | Nelson et al. |
| 2004/0034592 A1 | 2/2004 | Hu et al. |
| 2004/0039666 A1 | 2/2004 | Fudali et al. |
| 2004/0068568 A1 | 4/2004 | Griffin et al. |
| 2004/0158520 A1 | 8/2004 | Noh |
| 2004/0205019 A1 | 10/2004 | Painter et al. |
| 2004/0220872 A1 | 11/2004 | Pollock, III |
| 2005/0027651 A1 | 2/2005 | DeVault |
| 2005/0060280 A1 | 3/2005 | Wolfston, Jr. et al. |
| 2005/0065871 A1 | 3/2005 | Gerhart et al. |
| 2005/0086176 A1 | 4/2005 | Dahlgren et al. |
| 2005/0093881 A1 | 5/2005 | Okita et al. |
| 2005/0125338 A1 | 6/2005 | Tidwell et al. |
| 2005/0154664 A1 | 7/2005 | Guy et al. |
| 2005/0198334 A1* | 9/2005 | Farber | G06F 9/505 |
| | | | 709/229 |
| 2005/0203834 A1 | 9/2005 | Prieston |
| 2005/0282141 A1 | 12/2005 | Falash et al. |
| 2006/0004651 A1 | 1/2006 | Corr et al. |
| 2006/0036870 A1 | 2/2006 | Dasari et al. |
| 2006/0047600 A1 | 3/2006 | Bodenheim et al. |
| 2006/0059073 A1* | 3/2006 | Walzak | G06Q 40/00 |
| | | | 705/35 |
| 2006/0074793 A1 | 4/2006 | Hibbert et al. |
| 2006/0106693 A1 | 5/2006 | Carlson et al. |
| 2006/0106695 A1 | 5/2006 | Carlson et al. |
| 2006/0206416 A1 | 9/2006 | Farias |
| 2006/0224501 A1 | 10/2006 | Louis |
| 2006/0265258 A1 | 11/2006 | Powell et al. |
| 2007/0011083 A1 | 1/2007 | Bird et al. |
| 2007/0055596 A1 | 3/2007 | Tankovich et al. |
| 2007/0100990 A1 | 5/2007 | Brown et al. |
| 2007/0150330 A1 | 6/2007 | McGoveran |
| 2007/0162375 A1 | 7/2007 | Delf |
| 2007/0198401 A1 | 8/2007 | Kunz |
| 2007/0244805 A1 | 10/2007 | Wiryawan et al. |
| 2007/0289956 A1 | 12/2007 | Knysh et al. |
| 2008/0052224 A1 | 2/2008 | Parker |
| 2008/0097898 A1 | 4/2008 | Hibbert et al. |
| 2008/0103963 A1 | 5/2008 | Mahoney et al. |
| 2008/0133391 A1 | 6/2008 | Kurian et al. |
| 2008/0133402 A1 | 6/2008 | Kurian et al. |
| 2008/0172669 A1 | 7/2008 | McCullough et al. |
| 2008/0209213 A1 | 8/2008 | Astrand et al. |
| 2008/0209313 A1 | 8/2008 | Gonser |
| 2008/0263022 A1 | 10/2008 | Kostorizos et al. |
| 2008/0301038 A1 | 12/2008 | Anderson et al. |
| 2009/0019351 A1 | 1/2009 | Hitchcock et al. |
| 2009/0052390 A1 | 2/2009 | Gu et al. |
| 2009/0055309 A1 | 2/2009 | Hu et al. |
| 2009/0078757 A1 | 3/2009 | Hanson et al. |
| 2009/0112649 A1 | 4/2009 | Wernikoff |
| 2009/0119229 A1 | 5/2009 | Fudali et al. |
| 2009/0164387 A1 | 6/2009 | Armstrong et al. |
| 2009/0164431 A1 | 6/2009 | Zivkovic et al. |
| 2009/0187512 A1 | 7/2009 | Giroux et al. |
| 2009/0248560 A1 | 10/2009 | Recce et al. |
| 2009/0319387 A1 | 12/2009 | Keithley et al. |
| 2010/0057609 A1* | 3/2010 | Sibson | G06Q 20/10 |
| | | | 705/38 |
| 2010/0070950 A1 | 3/2010 | Smith et al. |
| 2010/0153827 A1 | 6/2010 | Koster et al. |
| 2010/0186066 A1 | 7/2010 | Pollard |
| 2010/0274708 A1 | 10/2010 | Allen |
| 2010/0274709 A1 | 10/2010 | Iwane |
| 2010/0287092 A1 | 11/2010 | Colman et al. |
| 2010/0293108 A1 | 11/2010 | Gurvitch et al. |
| 2010/0325584 A1 | 12/2010 | McKenzie |
| 2011/0075824 A1 | 3/2011 | Geppert et al. |
| 2011/0078012 A1* | 3/2011 | Adamec | G06Q 30/02 |
| | | | 705/14.39 |
| 2011/0106692 A1 | 5/2011 | Moore et al. |
| 2011/0112951 A1 | 5/2011 | Gould |
| 2011/0112957 A1* | 5/2011 | Ingram | G06Q 40/02 |
| | | | 705/38 |
| 2011/0131122 A1 | 6/2011 | Griffin et al. |
| 2011/0145164 A1 | 6/2011 | Lavoie et al. |
| 2011/0161135 A1 | 6/2011 | Lee et al. |
| 2011/0161375 A1 | 6/2011 | Tedder et al. |
| 2011/0173093 A1 | 7/2011 | Psota et al. |
| 2011/0191303 A1 | 8/2011 | Kaufman et al. |
| 2011/0270833 A1 | 11/2011 | von Kaenel et al. |
| 2011/0296380 A1 | 12/2011 | Dvinov et al. |
| 2012/0011056 A1 | 1/2012 | Ward et al. |
| 2012/0029977 A1 | 2/2012 | Alcorn et al. |
| 2012/0143748 A1 | 6/2012 | Hu et al. |
| 2012/0191594 A1 | 7/2012 | Welch et al. |
| 2012/0203701 A1 | 8/2012 | Ayuso de Paul |
| 2012/0215812 A1 | 8/2012 | Gilstrap et al. |
| 2012/0246060 A1 | 9/2012 | Conyack, Jr. et al. |
| 2012/0290467 A1 | 11/2012 | Shenkar et al. |
| 2013/0006844 A1 | 1/2013 | Kremen |
| 2013/0006845 A1 | 1/2013 | Kremen |
| 2013/0030985 A1 | 1/2013 | Shebesta et al. |
| 2013/0073400 A1* | 3/2013 | Heath | G06Q 30/02 |
| | | | 705/14.73 |
| 2013/0080316 A1 | 3/2013 | Pawlusiak et al. |
| 2013/0085925 A1 | 4/2013 | Simpson |
| 2013/0179331 A1 | 7/2013 | Bennett |
| 2013/0212279 A1* | 8/2013 | Dutta | G06F 9/5061 |
| | | | 709/226 |
| 2013/0231962 A1 | 9/2013 | Au Li |
| 2013/0232539 A1 | 9/2013 | Polunin et al. |
| 2013/0297488 A1 | 11/2013 | Boyanov et al. |
| 2013/0332337 A1 | 12/2013 | Tran |
| 2013/0332862 A1 | 12/2013 | Mirra et al. |
| 2013/0339922 A1 | 12/2013 | Sproule |
| 2014/0012846 A1 | 1/2014 | Snell et al. |

(56) References Cited

U.S. PATENT DOCUMENTS

| | | |
|---|---|---|
| 2014/0129411 A1 | 5/2014 | Fudali et al. |
| 2014/0172679 A1 | 6/2014 | Shimko |
| 2014/0201063 A1 | 7/2014 | Snell et al. |
| 2014/0258093 A1 | 9/2014 | Gardiner et al. |
| 2014/0289098 A1 | 9/2014 | Walzak |
| 2015/0006515 A1 | 1/2015 | Hopkins |
| 2015/0039491 A1 | 2/2015 | Snell et al. |
| 2015/0081591 A1 | 3/2015 | Chakar et al. |
| 2015/0248724 A1 | 9/2015 | Snell et al. |
| 2015/0294069 A1 | 10/2015 | Shah |
| 2015/0310390 A1 | 10/2015 | Steele et al. |
| 2016/0034834 A1 | 2/2016 | Snell et al. |
| 2016/0035023 A1 | 2/2016 | Snell et al. |
| 2016/0125070 A1 | 5/2016 | Snell |
| 2016/0171613 A1 | 6/2016 | Snell |
| 2017/0270602 A1 | 9/2017 | Snell et al. |

OTHER PUBLICATIONS

U.S. Appl. No. 15/289,440 "Preinterview First Office Action" dated Sep. 25, 2017, 5 pages.

U.S. Appl. No. 14/993,328 "Preinterview First Office Action" dated Apr. 19, 2016, 5 pages.

U.S. Appl. No. 14/993,328 "First Action Interview Pilot Program Pre-Interview Communication" dated Apr. 19, 2016, 4 pages.

U.S. Appl. No. 14/993,328 "Notice of Allowance" dated Jun. 16, 2016, 9 pages.

U.S. Appl. No. 14/590,714 "Preinterview First Office Action" dated Jul. 7, 2015, 5 pages.

U.S. Appl. No. 14/590,714 "First Action Interview Office Action Summary" dated Sep. 3, 2015, 10 pages.

U.S. Appl. No. 14/590,714 "Preinterview First Office Action" dated Jul. 7, 2015, 4 pages.

U.S. Appl. No. 14/516,363 "Preinterview First Office Action" dated Jan. 5, 2015, 5 pages.

U.S. Appl. No. 14/516,363 "First Action Interview Summary" dated Jan. 26, 2015, 8 pages.

U.S. Appl. No. 14/516,363 "Notice of Allowance" dated Mar. 30, 2015, 21 pages.

U.S. Appl. No. 14/713,899 "Non-Final Office Action" dated May 26, 2016, 11 pages.

U.S. Appl. No. 14/713,899 "Notice of Allowance" dated Aug. 30, 2016, 10 pages.

U.S. Appl. No. 14/211,138 "Preinterview First Office Action" dated Aug. 29, 2014, 7 pages.

U.S. Appl. No. 14/211,138 "First Action Interview Office Action" dated Oct. 15, 2014, 7 pages.

U.S. Appl. No. 14/211,138 "Notice of Allowance" dated Mar. 4, 2015, 20 pages.

U.S. Appl. No. 14/713,899 "Preinterview First Office Action" dated Jan. 3, 2014, 7 pages.

U.S. Appl. No. 14/713,899 "First Action Interview Office Action" dated Mar. 5, 2014, 7 pages.

U.S. Appl. No. 14/713,899 "Notice of Allowance" dated Apr. 9, 2014, 26 pages.

U.S. Appl. No. 13/673,638 "Preinterview First Office Action" dated Feb. 14, 2013, 5 pages.

U.S. Appl. No. 13/673,638 "First Action Interview Office Action" dated May 14, 2013, 4 pages.

U.S. Appl. No. 13/673,638 "Notice of Allowance" dated Jun. 27, 2013, 14 pages.

U.S. Appl. No. 15/071,339 "Preinterview First Office Action" dated Aug. 11, 2016, 5 pages.

U.S. Appl. No. 15/071,339 "First Action Interview Office Action" dated Sep. 28, 2016, 6 pages.

U.S. Appl. No. 15/071,339 "Notice of Allowance" dated Dec. 2, 2016, 23 pages.

U.S. Appl. No. 14/848,119 "Preinterview First Office Action" dated Feb. 2, 2016, 7 pages.

U.S. Appl. No. 14/848,119 "First Action Interview Office Action" dated Mar. 3, 2016, 9 pages.

U.S. Appl. No. 14/848,119 "Notice of Allowance" dated May 24, 2016, 26 pages.

U.S. Appl. No. 15/485,138 "Preinterview First Office Action" dated Oct. 24, 2017, 5 pages.

U.S. Appl. No. 15/485,138, Notice of Allowance dated Mar. 21, 2018, 8 pages.

* cited by examiner

STRUCTURE-BASED ENTITY ANALYSIS

CROSS-REFERENCES TO RELATED APPLICATIONS

This application is a non-provisional of and claims the benefit of and priority to U.S. Patent Application No. 62/187,487 filed Jul. 1, 2015, the entire contents of which is hereby incorporated by reference for all purposes.

FIELD

The technologies described herein relate to processor based data clustering, manipulation, and processing over a network using networked-grouping data.

BACKGROUND

Processing resource requests can involve concurrently processing networked-grouping data linked to the resource request. Identifying and processing networked-grouping data is complicated by complex linking associations. Further, traditional static storage of network-grouping data and the complex linking associations may fail to account for a potential dynamic nature of the networked-grouping data and to permit corresponding updates during resource request processing.

SUMMARY

In one embodiment the current disclosure is directed to a system for computing an outcome score associated with fulfilling a request for a first resource. The system includes a resource provider device that is connected to a network. The system also includes a resource requestor device connected to the network that sends a request for a resource. The system includes a linking processor that is also connected to the network that, in response to the request for a resource, identifies a first link between a first entity and a resource requestor, and identifies a second link between a second entity and the resource requestor. The system also contains an outcome score module that determines a first score of the first as a function of the first link and the first resource and determines a second score of the second entity as a function of the second link and first resource. The outcome score module also calculates a first weight as a function of the first link and calculates a second weight as a function of the second link. It then generates the outcome score by combining the first score and the second score as a function of on the first weight and the second weight. And then it causes, over the network, the outcome score to be displayed on the resource provider device, wherein the resource provider device causes, over the network, a response to appear on the resource requestor device.

As another embodiment the present description discloses the system for computing an outcome score associated with fulfilling a request for a first resource, wherein the outcome score module further calculates a third weight as a function of the resource requestor and the first resource; and generates the outcome score as a function of the first weight, the second weight, and the third weight.

The present specification also discloses the system for computing an outcome score associated with fulfilling a request for a first resource further comprising the linking processor that transforms the first entity, the second entity, and the resource requestor in a first networked grouping. And further comprising a cluster module that identifies a second networked grouping from prior resource requests, wherein the second networked grouping has a second link determined to be similar to the first link. The system further comprising the outcome score module that further: determines a third score based on the second networked grouping; generates a modified outcome score using the outcome score and the third score; and causes, over the network, the modified outcome score to be displayed on the resource provider device, wherein the resource provider device causes, over the network, a response to appear on the resource requestor device.

Also disclosed is the system for computing an outcome score associated with fulfilling a request for a first resource, wherein the outcome score module generates a modified outcome score as a function of the third score. And another embodiment discloses the system for computing an outcome score associated with fulfilling a request for a first resource, further comprising: a resource placement module that: determines a third entity in second networked grouping lacks the first resource type; and causes, over the network, a message to appear on the resource provider device that the third entity lacks the first resource type, wherein the resource provider device causes, over the network, an offer of the first resource to appear on the third entity device Another embodiment disclosed is the system for computing an outcome score associated with fulfilling a request for a first resource, further comprising the linking processor that transforms the first entity, the second entity, and the resource requestor in a first networked grouping. And further including a cluster module that identifies a second networked grouping from prior resource requests, wherein the second networked grouping has a second resource determined to be similar to the first resources. The system further includes the outcome score module that further: determines a third score based on the second networked grouping; generates a modified outcome score using the outcome score and the third score; and causes, over the network, the modified outcome score to be displayed on the resource provider device, wherein the resource provider device causes, over the network, a response to appear on the resource requestor device.

In another embodiment the current disclosure is directed to a processor-implemented method for computing an outcome score associated with fulfilling a request for a first resource, the system. The method includes the steps of receiving, over a network, the request for the first resource, from a resource requestor device, by a resource provider device; identifying a first link between a first entity and a resource requestor, identifying a second link between a second entity and the resource requestor; determining a first score of the first entity as a function of the first link and the first resource; determining a second score of the second entity as a function of the second link and first resource; calculating a first weight as a function of the first link; calculating a second weight as a function of the second link; generating the outcome score by combining the first score and the second score as a function of on the first weight and the second weight; and causing, over the network, the outcome score to be displayed on the resource provider device, wherein the resource provider device causes, over the network, a response to appear on the resource requestor device.

In an additional embodiment here is disclosed the processor-implemented method for computing an outcome score associated with fulfilling a request for a first resource further comprising: calculating a third weight as a function of the resource requestor and the first resource; and generating the outcome score as a function of the first weight, the second weight, and the third weight. Further disclosed is the processor-implemented method for computing an outcome score associated with fulfilling a request for a first resource, further comprising: transforming the first entity, the second entity, and the resource requestor in a first networked grouping; identifying a second networked grouping from prior resource requests, wherein the second networked grouping has a second resource determined to be similar to the first resources; determining a third score based on the second networked grouping; generating a modified outcome score using the outcome score and the third score; and causing, over the network, the modified outcome score to be displayed on the resource provider device, wherein the resource provider device causes, over the network, a response to appear on the resource requestor device This disclosure also describes the embodiment of the processor-implemented method for computing an outcome score associated with fulfilling a request for a first resource, further comprising: transforming the first entity, the second entity, and the resource requestor in a first networked grouping; identifying a second networked grouping from prior resource requests, wherein the second networked grouping has a second link determined to be similar to the first link; determining a third score based on the second networked grouping; generating a modified outcome score using the outcome score and the third score; and causing, over the network, the modified outcome score to be displayed on the resource provider device, wherein the resource provider device causes, over the network, a response to appear on the resource requestor device.

Another embodiment disclosed is the processor-implemented method for computing an outcome score associated with fulfilling a request for a first resource, further comprising generating a modified outcome score as a function of the third score. An yet a further embodiment is the processor-implemented method for computing an outcome score associated with fulfilling a request for a first resource, further comprising generating a modified outcome score as a function of the third score. And yet another embodiment disclosed is the processor-implemented method for computing an outcome score associated with fulfilling a request for a first resource, further comprising: determining a third entity in the second networked grouping lacks the first resource type; and causing, over the network, a message to appear on the resource provider device that the third entity lacks the first resource type, wherein the resource provider device causes, over the network, an offer of the first resource to appear on the third entity device.

In yet another embodiment the present specification discloses a non-transitory computer readable medium having instruction sets stored thereon that, when executed by computer, cause the computer to: receive, over a network, the request for the first resource, from a resource requestor device, by a resource provider device; identify a first link between a first entity and a resource requestor; identify a second link between a second entity and the resource requestor; determine a first score of the first entity as a function of the first link and the first resource; determine a second score of the second entity as a function of the second link and first resource; calculate a first weight as a function of the first link; calculate a second weight as a function of the second link; generate the outcome score by combining the first score and the second score as a function of on the first weight and the second weight; and cause, over the network, the outcome score to be displayed on the resource provider device, wherein the resource provider device causes, over the network, a response to appear on the resource requestor device.

In yet another embodiment there is disclosed the non-transitory computer readable medium having instruction sets stored thereon, that when executed by computer, cause the computer to: transform the first entity, the second entity, and the resource requestor in a first networked grouping; identify a second networked grouping from prior resource requests, wherein the second networked grouping has a second resource determined to be similar to the first resources; determine a third score based on the second networked grouping; generate a modified outcome score using the outcome score and the third score; and cause, over the network, the modified outcome score to be displayed on the resource provider device, wherein the resource provider device causes, over the network, a response to appear on the resource requestor device.

Also disclosed is the non-transitory computer readable medium having instruction sets stored thereon, that when executed by computer, cause the computer to: transform the first entity, the second entity, and the resource requestor in a first networked grouping; identify a second networked grouping from prior resource requests, wherein the second networked grouping has a second link determined to be similar to the first link; determine a third score based on the second networked grouping; generate a modified outcome score using the outcome score and the third score; and cause, over the network, the modified outcome score to be displayed on the resource provider device, wherein the resource provider device causes, over the network, a response to appear on the resource requestor device.

Further disclosed is the non-transitory computer readable medium having instruction sets stored thereon, that when executed by computer, cause the computer to generate a modified outcome score as a function of the third score. And also disclosed is the non-transitory computer readable medium having instruction sets stored thereon, that when executed by computer, cause the computer to: determine a third entity in the second networked grouping lacks the first resource type; and cause, over the network, a message to appear on the resource provider device that the third entity lacks the first resource type, wherein the resource provider device causes, over the network, an offer of the first resource to appear on the third entity device.

BRIEF DESCRIPTION OF THE DRAWINGS

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

The present disclosure is described in conjunction with the appended figures.

In the appended figures, similar backings and/or features may have the same reference label. Where the reference label is used in the specification, the description is applicable to any one of the similar backings having the same reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
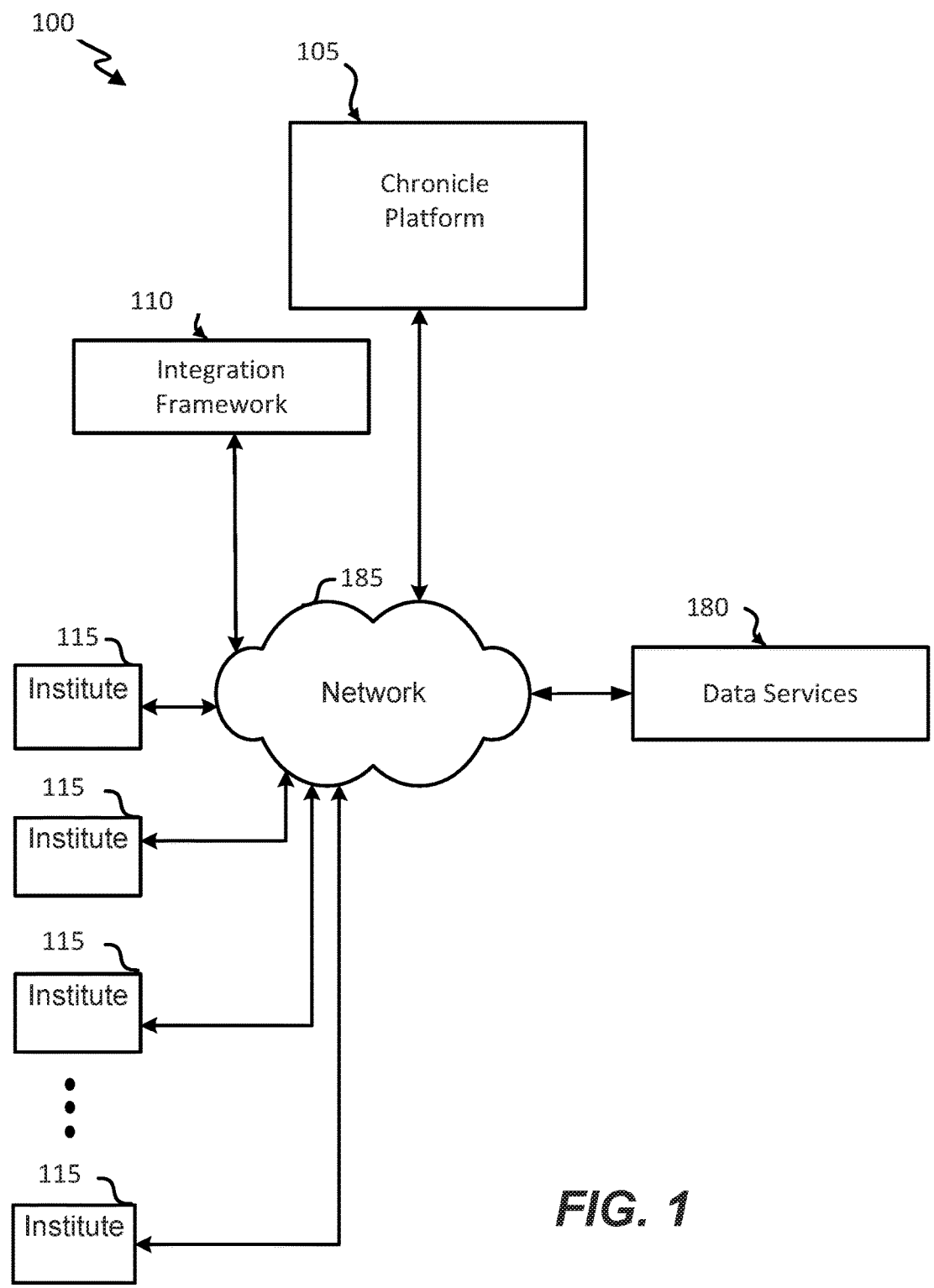
FIG. 1 depicts a block diagram of an embodiment of a chronicle system.

FIG. 1 depicts a block diagram of an embodiment of a chronicle system 100. This embodiment of the chronicle system 100 is built on a multitenant platform such as the Salesforce™ Force.com platform. The multitenant platform is used to provide services from one tenant to multiple unrelated tenants. Each institute 115 (banks, credit unions, institute 115, etc.) is at least one tenant on the multitenant platform and each tenant uses services on the multitenant platform. A chronicle platform 105 and an integration framework 110 are each tenants on the multitenant platform that provide services to other tenants. An advantage of a multitenant platform is that it is unnecessary for tenants in the multitenant platform to be co-located and, as such, tenants can be separated geographically in some cases but share a geographic location in other cases. Another advantage of using a multitenant platform is that each of the institutes 115 tenants on the multitenant platform use the chronicle platform 105 and/or the integration framework 110 over a network 185 (a network is a system of computers and peripherals that are linked together and can consist of as few as two computing devices connected or millions of computers over a large geographical area with or without wires—such as the internet or the cellular telephone network) such that it is unnecessary for each of the institutes 115 to host their own chronicle platform 105 or integration framework 110. In other embodiments of the chronicle system 100, at least one of the institutes 115 host the chronicle system 100 and/or provide portals to the chronicle system 100.

The institutes 115 use the integration framework 110 and the chronicle platform 105 to perform, for example, chronicle processing, access management, status monitoring, version generation, backing processing, data aggregation, entity processing, and report generation. The institutes 115 are entities that can fulfill a resource request and/or provide services.

The network 185 connects each of the institutes 115 with the integration framework 110, the chronicle platform 105, and one or more data services 180. The network 185 can include, for example, the Internet, an intranet, a secure network, a virtual private network, a local area network, a wide area network, or a wireless network. A network is a system of computers and peripherals that are linked together and can consist of as few as two computing devices connected or millions of computers over a large geographical area with or without wires—such as the Internet or the cellular telephone network. The network 185, for example, uses encrypted communications to securely transmit data in some embodiments. The network 185 can connect each of one or more institutes 115 with the integration framework 110, the chronicle platform 105, and one or more data services 180 using standard or custom APIs in some embodiments or with any other method or protocol to communicate over a network.

The data services 180 send service data to the institutes 115 and/or the integration framework 110 on the network 185 through to the chronicle platform 105. The chronicle platform 105 uses the service data to, for example, process chronicles, capture resource memorandum versions, aggregate data, and generate reports that the institutes 115 use to grant or deny resource requests. In one instance, the chronicle platform 105 detects, for each chronicle, which content buckets associated with the chronicle have been filled with a corresponding content objects. The detection can include, for example, identifying particular content buckets based on a request type and checking a status of each of the particular content buckets in correspondence with resource request identifier.

The integration framework 110 is also a tenant on the multitenant platform. The integration framework 110 receives data and requests in any variety of data formats from one or more sources including the institutes 115, the chronicle platform 105, and the data services 180. In some cases the institutes 115, the data services 180, and the chronicle platform 105 push data and/or requests to the integration framework 110. The integration framework 110 fulfills the request, transforms the data, and sends the data to the correct target. For example: the chronicle platform 105 sends a request for an extension report to the integration framework 110; the integration framework 110 retrieves the report from the extension service 135; transforms it to a format compatible with the chronicle platform 105, and sends the result to the chronicle platform 105. The integration framework 110 receives data in real-time, in batches, or as updated data. The integration framework 110 uses servers and databases to transform the data from a source to a format compatible with the target it is intended for; and sends it to that target. For instance, when the chronicle platform 105 generates an updated resource memoranda for the institutes 115, it sends the updated resource memorandum to the integration framework 110, and then the integration framework 110 transforms the updated resource memorandum to a format expected by institutes 115, and sends it to institutes 115. The integration framework 110 receives and transforms data from other tenants on the multitenant platform concurrently in some cases or sequentially in others. The integration framework 110 is a first interface between both the institutes 115 and the data services 180 and the chronicle platform 105.

The chronicle platform 105 communicates with the institutes 115 and the integration platform 110 using the network 185. The chronicle platform 105 receives content objects from the institutes 115 and the integration framework 105. The chronicle platform 105 creates chronicles and populates the chronicles with the content objects (e.g., received from, or generated based on data received from, a user device, institute agent device, etc.). Each chronicle can pertain to one resource request, and the chronicle can include associated content objects and/or indications that one or more content objects of particular types have not been received. The chronicle can further include a status of each of one or more content object and/or the chronicle as a whole, which may relate to a level of completion and/or assessment.

The chronicle platform 105 generates information for the institutes 115 in some cases in a web page format or as an API and in other cases in standard or custom document formats, such as Word™. The chronicle platform 105 also aggregates data from multiple tenants and generates corresponding reports for the institutes 115. The chronicle platform 105 also uses the aggregated data to process chronicles. The chronicle platform 105 serves institutes 115 concurrently in some cases or sequentially in other cases.

Figure 2A:
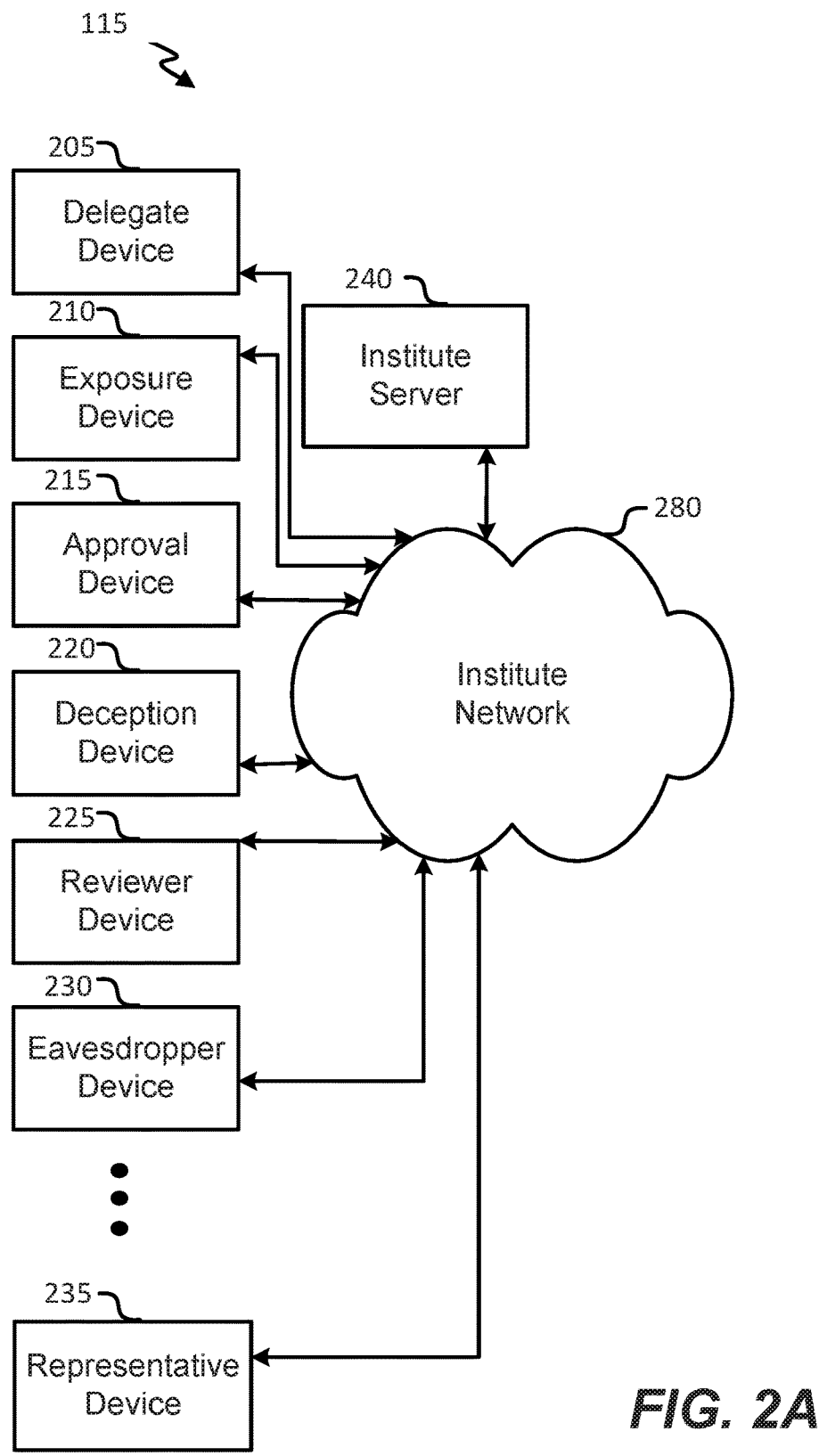
FIG. 2A depicts block diagrams of an institute.

FIG. 2A depicts a block diagram of an embodiment of an institute 115. The institute 115 access the chronicle platform 105 to obtain, for example, chronicle processing, resource memorandum updating, version capture, backing processing, data aggregation, and/or report generation. The institute 115 internal agents include: a delegate agent using a delegate device 205; an approval agent using approval device 215; a deception agent using a deception device 220; a reviewer agent using a reviewer device 225; an eavesdropper agent using an eavesdropper device 230; a exposure agents using a exposure device 210; and a representative using a representative device 235. Although this block diagram of an embodiment of institute 115 shows only the single delegate device 205, the single approval device 215, the single deception device 220, the single reviewer device 210, the single representative device 235, the single end-user device 250, the single watchdog device 255, and the single eavesdrop device 260, in other embodiments the institute 115 include multiple devices in each instance that correspond to multiple agents. The devices comprise all manner of computing apparatus such as general purpose computers, mainframe computers, terminals connected to servers, desktop computers, notebook computers, tablet computers, pad computers, and smart phones. The institute 115 internal and third-party agents use devices that are connected by an institute network 280 to an institute server 240. The institute server 240 may also be connected to an enterprise service bus 270 and the data services 180 by the institute network 280.

The delegate agent communicates with the end-user agent that initiated the resource request directly in some cases, for example, in-person or by telephone. The delegate agent requests data and documents from the end-user agent that are necessary to determine whether the end-user is qualified for the resource request. Alternatively the delegate device 205 communicates with the end-user device 250 over the institute network 280 via email, text, facsimile, or any other method of electronic communication. In most cases the chronicle platform 105 will trigger a version capture event when the delegate device 205 collects data from the end-user device 250. The delegate device 205 collects end-user agent data relevant to qualifying the end-user agent for the resource request and sends it to the enterprise service bus 270 or the institute server 240. The delegate device 205 makes requests for and accesses reports and documents that the chronicle platform 105 generates such as the resource memorandum. The delegate device 205 communicates over the institute network 280 with other internal devices including the exposure devices 210, the approval device 215, the deception device 220, the reviewer device 225, the eavesdropper device 230 and the representative device 235 over the institute network 280.

The exposure device 210 makes requests for and accesses reports and documents including the resource memorandum that the chronicle platform 105 generates. The exposure device 210 also requests additional data from the end-user device 250 in some cases when the chronicle platform 105 generates a report that indicates the end-user agent is associated with a risk that might be mitigated by additional end-user agent data. The exposure device 210 communicates with other internal devices such as the delegate device 205, the approval device 215, and the eavesdropper device 230 over the institute network 280. The approval agent approves the institutes 115 decision to grant or deny the end-user agent's resource request. The approval device 215 makes requests for and accesses reports and documents that the chronicle platform 105 generates, such as updated resource memorandum. The approval device 215 communicates with the reviewer device 225 over the institute network 280. The reviewer agent reviews institutes 115 decisions granting or denying end-user agent requests using the reviewer device 215 to access reports such as the resource memorandum that the chronicle platform 105 generates. The reviewer device 215 communicates with other internal devices such as the eavesdropper device 230 over the institute network 280.

The eavesdropper agent audits transactions related to resource requests. The eavesdropper device 230 makes requests for and accesses reports and documents including the resource memorandum that the chronicle platform 205 generates. For instance, the eavesdropper device 230 audits the resource memorandum capture history associated with the resource request. The eavesdropper device in some cases communicates with the watchdog device 255 and the eavesdrop device 260 over the institute network 280. The eavesdropper device 230 communicates with all other internal devices over the institute network 280, including the deception device 220. The deception agent monitors transactions related to resource requests including an end-user inaccurately reporting input. The deception device 220 also makes requests for and accesses reports and documents, including the resource memorandum generated by the chronicle platform 105. The deception device 220 in some cases communicates with the watchdog device 255 and the eavesdrop device 260 over the institute network 280. The deception device 220 communicates with all other internal devices such as the representative device 235 over the institute network 280. The representative agent 235 works in the institutes 115 front offices to conduct in-person end-user transactions. The representative device 235 can access reports and documents including resource memorandum generated by the chronicle platform 105 over the institute network 280.

The institute network 280 connects the internal devices, the third-party devices, the institute server 240, the data services 180 and the enterprise service bus 270. The institute network 280 can include, for example, the Internet, an intranet, a secure network, a virtual private network, a local area network, a wide area network, or a wireless network. The institute network 280, for example, in some embodiment uses encrypted communications to securely transmit data. The institute network 280 also connects using standard or custom APIs (an "application program interface" is a set of routines, protocols, and tools for building software applications that specify how software backings should interact) in some embodiments. In most embodiments the institute network 280 will include a firewall to protect the institutes 115 from security access breaches. A firewall is network security system, either hardware- or software-based, that controls incoming and outgoing network traffic based on a set of rules, and acts as a barrier between a trusted network and other untrusted networks—such as the Internet—or less-trusted networks—a firewall controls access to the resources of a network through a positive control model. This means that the only traffic allowed onto the network defined in the firewall policy is; all other traffic is denied.

The institute server 240 is a computing device connected to all internal and third-party devices, the data services 180, and the enterprise service bus 270 by the institute network 280. A server is an instance of a computer program that accepts and responds to requests made by another program typically called a client. Any device that runs server software can generally be considered a server. Servers are also typically used to manage and control a network's resources. Servers may be set up to control access to a network, send/receive e-mail, manage print jobs, or host a website. Some servers are committed to specific task; and then are referred to as dedicated. Servers are commonly used to deliver services that are required constantly, most servers are never turned off. The institute server 240 manages, stores, sends, receives, and processes data for the institutes 115. For example, the institute server 240 can provide institutes 115 with around-the-clock file and network security, centralized data storage and shared resources, virus management and centralized back up processes. In addition, the institute 240 server can control access to the institute network 280 and other internal process and manages all user credentials. The institute server 240 also can provide the authentication interface to mobile and third-party devices using the Internet or other external network from outside of the institute network 280 firewall. Additionally, the institute server 240 can provide increased reliability so that there are no interruptions in the institute 115 workflow processes such as the resource request process The institute server 240 maintains a local database and performs all internal processes for the institute 115. The institute server 240 also controls all requests to the chronicle platform 105 and access to the integration framework 110 made by all internal and third-party devices through the enterprise service bus 270. For instance, the institute sever 240 directs the enterprise service bus 270 to send updated account data to the chronicle platform each day at a particular time. The institute server 240 also provides file security for the institute 115 by designating an authorization for each file such that only authorized agents can gain access to that file. For instance, the institute server 240 will not allow an eavesdrop agent access to the institute 115 employee personal information. The institute server 240 also provides the institute 115 with critical virus protection services to protect the institute 115 from a virus that a third-party device might introduce. The institute server 240 also provides the authentication interface to mobile devices using the Internet, or any other network, outside of the institute network 280 firewall.

Figure 2B:
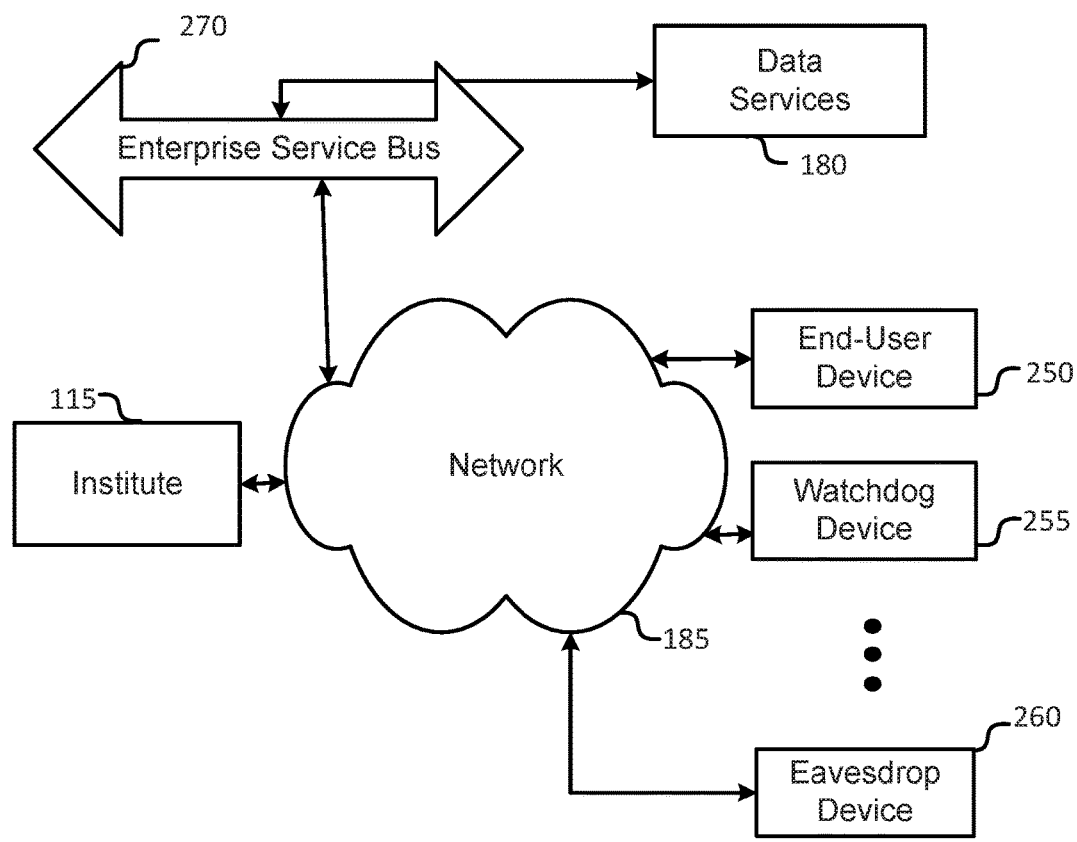
FIG. 2B depicts a block diagram of institutes communicating with other devices.

FIG. 2B depicts the institutes 115 that further comprise an enterprise service bus 270. The institute is in communication with data services 180 through the enterprise service bus 270. An enterprise service bus 270, or ESB, is fundamentally an architecture. It is a set of rules and principles for integrating numerous applications together over a bus type infrastructure. The enterprise service bus 270 is a second interface between both the institutes 115 and the data services 180 and the chronicle platform 105. The enterprise service bus 270 receives data in any variety of data formats from one or more sources including the data services 180. In some cases data services 180 push data to the enterprise service bus 270. Conversely, in other cases the enterprise service bus 270 pulls data from the data services 180. The enterprise service bus 270 receives data in real-time, in batches, or as updated data. The enterprise service bus 270 sends data to the chronicle platform in a predefined format acceptable by a data interface 365 and a user interface 320. The enterprise service bus 270 uses servers and databases to transform the data into other formats compatible with the chronicle platform 105. The enterprise service bus 270 sends the transformed date to the chronicle platform 105. The enterprise service bus 270 also transforms the date from the chronicle platform into the proper format for institutes 115. The enterprise service bus 270 also transforms data transmitted and received to and from the data services 180 into compatible formats as required. The enterprise service bus 270 distributes information across the institutes 115 quickly and easily, masks the hardware and networking differences among the devices using institutes 115, and integrates legacy processes and data to current workflows.

An end-user agent is the resource requester. The end-user agent communicates directly with the delegate agent, for instance in person or by telephone. The end-user agent electronically communicates with institutes 115 using the end-user device 250 and sends content objects related to the resource request to delegate device 205 or the institute server 240. The end-user device 250 accesses reports and documents that the chronicle platform 105 generates over the network 185. The watchdog agent monitors transactions related to resource requests for regulatory violations. The watchdog device 255 accesses reports and documents generated by the chronicle platform 105 over the network 185. The eavesdrop agent eavesdrops transactions related to resource requests including the resource memorandum capture history. The eavesdrop device 260 accesses reports and documents including the resource memorandum generated by the chronicle platform 105.

Figure 2C:
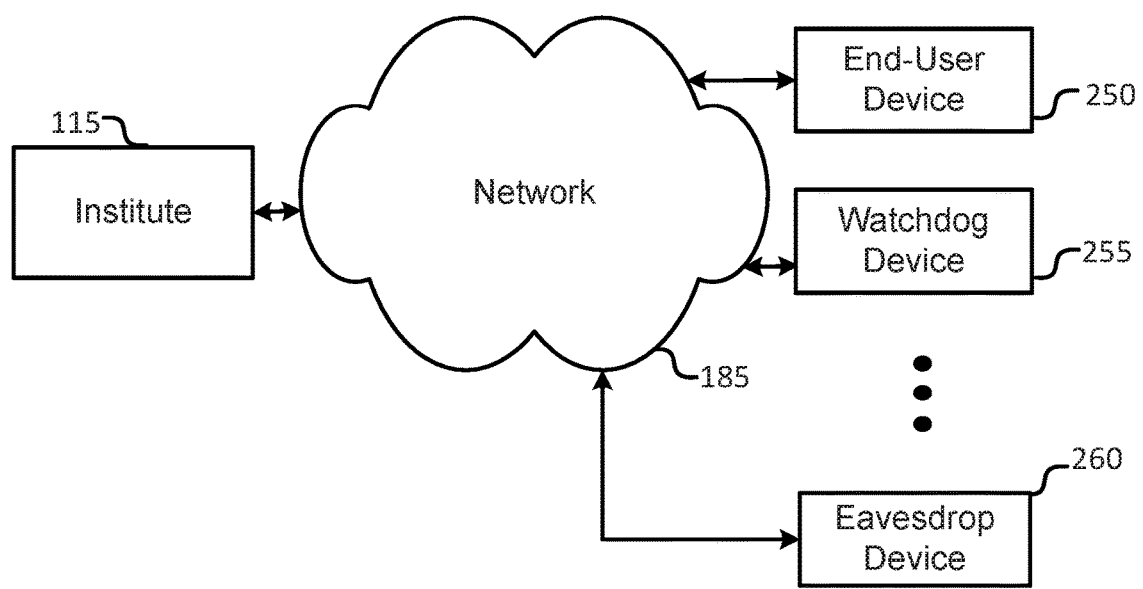
FIG. 2C depicts a block diagram of institutes communicating with other devices.

FIG. 2C depicts the institutes 115 (that need not include an enterprise service bus) that are not in direct communication with data services 180, as is shown in FIG. 2B, in communication with end user device 250, watchdog device 255 and eavesdrop device 260 over the network 185. In this embodiment, the integration framework 110 performs the data format transformations for institute 115 as well as interfaces with data services 180 for institutes 115.

Figure 3:
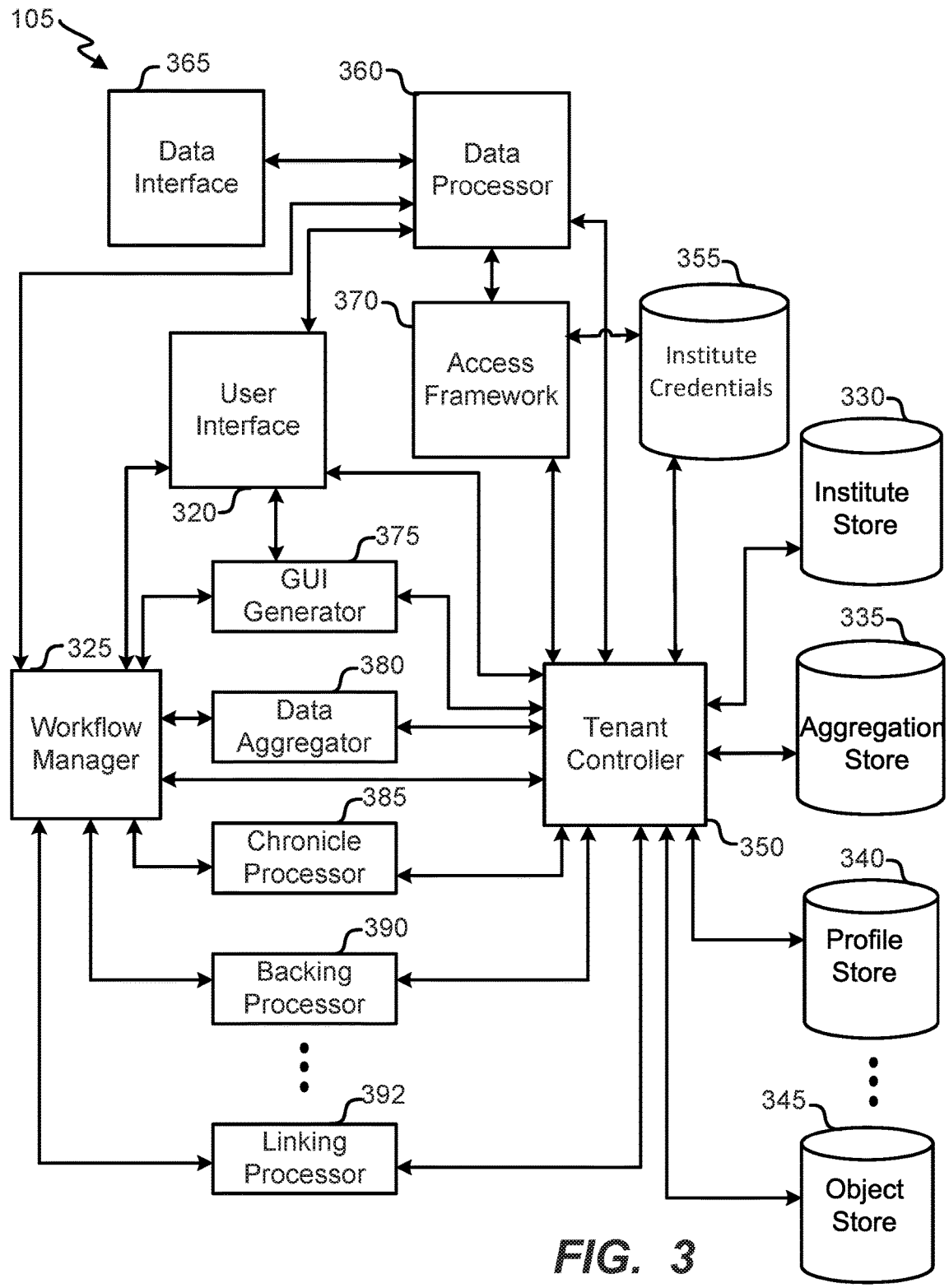
FIG. 3 depicts a block diagram of an embodiment of a chronicle platform.

FIG. 3 depicts the block diagram of an embodiment of the chronicle platform 105. The chronicle platform 105 is a tenant on the multitenant platform that the chronicle system 100 is built on. The chronicle platform 105 is the tenant that provides chronicle system 100 services to other tenants on the platform, specifically the institutes 115 tenants. The chronicle platform 105 communicates directly with the integration framework 110 and the institutes 115 through the data interface 365 and the user interface 320 over the network 185. The data interface 365 communicates using TCP/IP (transmission control protocol/internet protocol) with the integration framework 205 over the network 185. The data interface 365 uses HTTP(s) requests and responses. The data interface 365 transmits and receives data in JSON and XML formats embedded in the HTTP(s) requests and responses. For example, the data interface 365 uses the Salesforce™ Bulk API and makes an HTTP(S) request for large data files from institutes 115 and then receives them with the data embedded in JSON or XML formats in an HTTP(s) response from the integration framework 110. In another example the data interface 365 sends HTTP(s) requests to document service 175 with resource request data embedded in XML format. The data interface 365 also uses HTTP(S) web service calls to request and receive data. For example, the data interface 365 sends HTTP(s) web service requests to retrieve data from pricing service 130, identification service 155, and extension service 135.

The user interface 320 receives and transmits requests and responses between the institute 115 devices and the chronicle platform 105 over the network 185 using the enterprise service bus 270 or the integration framework 110. The user interface 320 uses HTTP(s) web service connections in addition to JSON and XML formats embedded in the HTTP(s) requests and responses to communicate and send and receive data between the chronicle platform 105 over the network 185 and to the institute 115 devices by way of the integration platform 110 or the enterprise service bus 270. The user interface 320 transmits presentation data generated by the GUI generator 375 to the institute 115 devices using HTTP(s) web services. While described separately here, both the user interface 320 and the data interface 365 can be combined as a single interface or can be hosted on a single processor. In other embodiments the user interface 320 and the data interface 365 also use any form of network communication protocols not described here.

A data processor 360 filters the credential and permission information from incoming HTTP(s) requests and responses from data interface 365 and user interface 320 and sends them to an access framework 370 to determine if the requests and responses are from a verified source. The data processor 360 stops processing the HTTP(s) request or response if the access framework 370 does not verify the source. The data processor 360 extracts the embedded data from the response. The data processor 360 then sends the extracted data to a tenant controller 350 and transmits the filtered response to a workflow manager 325. For instance, when the chronicle platform 105 makes an HTTP(s) request for an extension report from the integration framework 110: the integration framework 110 returns an HTTP(s) response with the extension data requested embedded in the HTTP(s) response; the data processor 360 filters the HTTP(s) response and sends the credential and permission information to the access manager 370; the access manager verifies the source; the data processor 360 then extracts the extension data and sends it to the tenant controller 350; and the data processor 360 sends the filtered response to the workflow manager 325. When the workflow manager 325 is ready to send an HTTP(s) request or a response, it transmits instructions to the data processor 360. The data processor 360 interprets the instructions from the workflow manager 325, retrieves data from the tenant controller 350 if so instructed, compiles the HTTP(s) request or response, and transmits the compiled HTTP(s) request or response to the data interface 365. For instance, when the workflow manager 325 starts a workflow: workflow manager 325 sends instructions to the data processor 360 to retrieve the resource data from the tenant controller 350 along with general delivery instructions; the data processor 360 retrieves the resource data from the tenant controller 350 and complies the HTTP(s) response; and the data processor 360 transmits the compiled HTTP(s) response to the data interface 365. At the same time the workflow manager 325 sends instructions to the GUI generator 375 to create a presentation for the institutes 115 devices and instructs the data processor 360 to transmit that presentation to the user interface 320.

The workflow manager 325 manages the processes and interactions in the chronicle platform 105. The workflow manager 325 receives filtered requests and responses from the data processor 360 and parses and interprets them to determine which of the GUI generator 375, the data aggregator 380, the chronicle processor 385, the backing processor 390, and the linking 392 processes to initiate and control in response to the requests and responses. The workflow manager 325 also receives triggers from the chronicle platform 105 itself that indicate an event has occurred that requires further processing. The workflow manager 325 then initiates the processes, manages the processes to the end, and controls and coordinates interactions among processes. For instance, when the institutes 115 request or a triggering event occurs, the workflow manager 325: instructs the tenant controller 350 to retrieve the correct data and send it the correct processor; starts the correct processor; waits for the outcome; instructs the processor to send the result to the tenant controller 350; instructs the tenant controller 350 to retrieve data and send it to the chronicle processor 385; starts the chronicle processor 385; waits for the chronicle processor 385 to finish; instructs the chronicle processor to send the result to the tenant controller 350; instructs the tenant controller 350 to retrieve data and send it to a GUI processor 375; instructs the GUI processor to generate a browser viewable form of the process result; waits for the GUI processor 375 to finish; instructs the GUI processor 375 to send the result to the tenant controller 350; instructs the tenant controller 350 to retrieve data and send it to the data processor 360; and then instructs the data processor 360 to generate an HTTP(s) response that contains a presentation of the event that triggered the process. The workflow manager 325 identifies the workflow progression for any process on the chronicle platform 105. The workflow manager 325 initiates each of the GUI generator 375, the data aggregator 380, the chronicle processor 385, the backing processor 390, the linking processor 392, and the linking processor 392 simultaneously or successively or both. A graphical user interface known here as a GUI, is a type of interface that allows users to interact with electronic devices through graphical icons and visual indicators such as secondary notation, as opposed to text-based interfaces, typed command labels or text navigation.

The access framework 370 controls access to the chronicle platform 105. The access framework 370 receives credentials and permissions from incoming HTTP(s) requests and responses; retrieves credentials and permissions from an institute credentials 355; and verifies that the credentials and permissions match or validates them in any number of ways. The access framework 370 also retrieves credentials permissions from the institute credentials 355 and sends them to the tenant controller 350 for the data processor 360 to embed them into the HTTP(s) requests and responses that the data interface 365 sends to the integration framework 110 or the institutes 115. The Hypertext Transfer Protocol (HTTP) is an application protocol for distributed, collaborative, hypermedia information systems. It is the foundation of data communication for the World Wide Web. Hypertext is structured text that uses logical links (hyperlinks) between nodes containing text.

The access framework 370 manages permissions based on inputs. For example, an end-user having requested a resource can specify permissions pertaining to the request. The permissions can indicate that one or more other users or agents are permitted to access select or all data pertaining to the request. Permissions may, but need not, be time-limited, which may include limiting access permission to (for example) a particular period of absolute time (e.g., date range) or a period of time with a beginning or end defined by a given event (e.g., detection of a content object or progression to a new state in a workflow). As one illustration, a requestor device may identify one or more agents via corresponding email addresses to indicate that each of the one or more agent is permitted to access data being collected and submitted for the request. Should any of these identifiers subsequently be received from a device as a form of identification, the access framework 370 may determine that data pertaining to the request (e.g., previously collected data, analysis of previously collected data and/or specifications of data that still is to be collected) can be transmitted to the device.

Permissions may, but need not, be tied to task delegation. In one instance, delegating a task pertaining to a request to a given agent has an effect of also granting access permission (e.g., to task-specific data and/or request-specific data) to the agent. The access permission may include (for example) a read-access and/or an access that permits uploading, data entry, and/or data editing. A task that is delegated may include, e.g., providing a particular type of content object or a particular type of data (e.g., corresponding to a given field).

The tenant controller 350 retrieves and stores data used by all of the processes on the chronicle platform 105. The tenant controller 350 is connected to all storage media and all processors on the chronicle platform. The workflow manager 325 instructs the tenant controller 350 when to retrieve data and where to send it. For instance, when the workflow manager 325 is ready to initiate the chronicle processor 385 to complete a workflow, it instructs the tenant controller 350 to retrieve all of the data required to process the workflow and to send it to the chronicle processor 385. The workflow manager 325 instructs the chronicle processor 385 to send the result to the tenant controller 350 when it has completed processing.

The institute credentials 355 stores institutes 115 credentials and permissions. An institute store 330 stores data specific to each of the institutes 115 and its end-users. The data may include, for example, agent-identifying information (e.g., email addresses), credentials of one or more agents, and/or associations between each of one or more agents and one or more requests.

An aggregator store 335 stores results from a data aggregator 380. A profile store 340 and an object store 345 store data local to the chronicle platform 105. Although depicted as separate storage in FIG. 3, the institute credentials 355, the institute store 330, the aggregator store 335, the profile store 340 and object store 345 are implemented in one or more storage devices in other embodiments.

The GUI generator 375 generates the graphical user interface presentations that the chronicle platform 105 sends through the integration framework 110 or the enterprise service bus 270 to the agent that sent an HTTP(s) request or response to the chronicle platform 105. The workflow manager 325 starts the GUI generator 375 after instructing the tenant controller 350 to retrieve and send data to the GUI generator 375. The institutes 115 may each have any number of graphical user interface format requirements. For instance the GUI generator 375 will generate different graphical user interfaces for a tablet than for a smart phone and yet another for a laptop computer. The workflow manager 325 passes the GUI generator 375 the necessary format instruction in some circumstances and in other circumstances the tenant controller 350 sends the format instruction.

The data aggregator 380 aggregates data from any number of sources that is relevant to processing the resource request. In one example the data aggregator 380 collects data (e.g., pertaining to multiple requests) from many tenants on the multitenant platform. The data aggregator 380 then strips all confidential and personal information from the data it receives from the many tenants so that all tenants can access the aggregated data. The data aggregator 380 groups like data and performs any number of statistical analyses on that data. For example, the data aggregator 380 computes the average attribute of every end-user resource requester for all tenants. The data aggregator 380 also aggregates entities and actions related to the resource request. The chronicle processor 390 uses the data aggregator 380 result to process chronicles.

The chronicle processor 390 manages interactions and information associated with the resource request. The chronicle processor 390 creates a chronicle for each resource request and populates the chronicle with content objects related to the resource request. The chronicle processor 390 manages all of the documents related to the resource request. The chronicle processor 390 tracks a status of document provision, such that—for a particular request—it can be determined (for example) which content objects have been received, completed, reviewed and/or finalized and/or which content objects still may be or must be received, completed, reviewed and/or finalized for full processing of the request. The chronicle processor 390 processes the content objects in the chronicle to generate and update the resource memorandum and other reports related to the resource request. The chronicle processor 390 uses the content objects from the data services 180 to populate the chronicle with data used to qualify the resource request.

The chronicle processor 390 creates a trigger that the workflow manager 325 detects and processes when predetermined events occur. For instance, when the chronicle processor 390 fills a chronicle with all of the content objects required to establish the qualification profile of the resource requester, the chronicle processor 390 creates the trigger that workflow manager 325 detects and then, once detected, initiates the workflow for capturing a version of the resource memorandum. As another example, the chronicle processor 390 creates a trigger that a delegated task has not been completed by a particular time. An alert may then be generated (e.g., to be presented via the GUI generator 375) or the task may automatically be re-delegated.

The workflow manger 325 also initiates the GUI generator 375 to generate a presentation for the institutes 115 agent to signify that the documents required to qualify the resource request are complete, and as such, the resource requester's qualification profile is ready for the institutes 115 agent to evaluate. The chronicle processor 390 is workflow driven by the workflow manager 325 that instructs the chronicle processor 390 how to progress through processing a chronicle based on any number of events occurring externally to the chronicle platform 105 as well as events occurring in the chronicle platform 105.

The backing processor 390 processes collateral related to the resource request. The backing processor 390 calculates for each piece of collateral such values as, for example, percent ownership, relative relationship to the resource requester, and annual revenue or losses it generates.

The linking processor 392 computes networked-grouping and networked-grouping clustering as part of calculating the outcome score assessment for resource requests. The linking processor 392 also determines resources related to the entities in the networked-grouping so that institutes 115 can more accurately target additional resources to entities in the networked-grouping and networked-grouping clusters.

Figure 4:
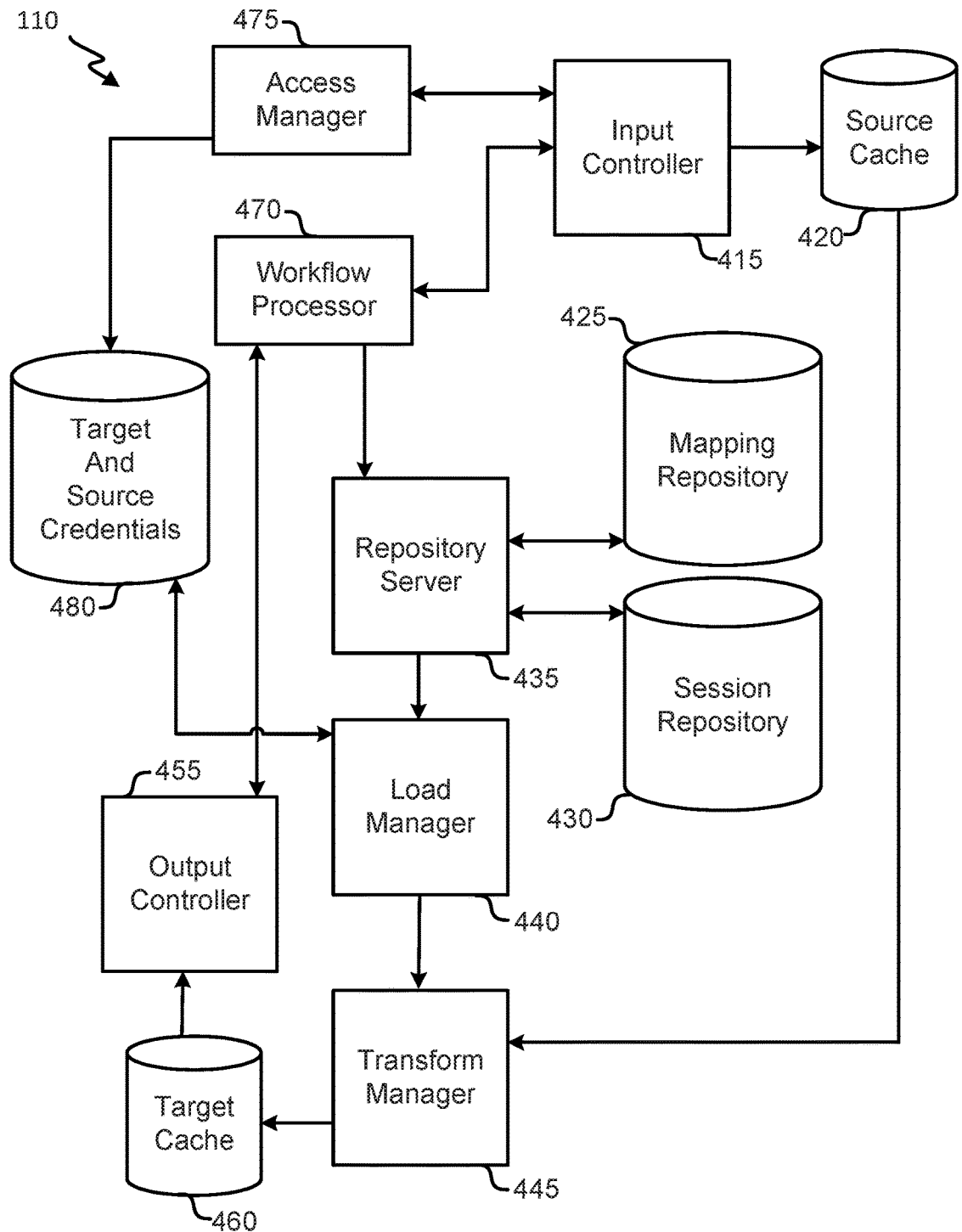
FIG. 4 depicts a block diagram of an embodiment of an integration framework.

FIG. 4 depicts the block diagram of an embodiment of the integration framework 110. The integration framework 110 is also a tenant on the multitenant platform the chronicle system 100 is built on. The integration framework 110 provides services to the chronicle platform 105 tenant and the institutes 115 tenants. The integration framework 110 is the first interface between both the data services 180 and the institutes 115 and the chronicle platform 105. The integration framework 110 therefore receives and sends HTTP(s) requests and responses to the institutes 115, the data services 180, and the chronicle platform 105. The integration platform 110 transforms embedded data in HTTP(s) requests and responses from a source data format of the requester or responder into a target data format for the intended recipient.

An access manager 475 controls input access to the integration platform 110. The access manager uses any known source of access authorization to align credentials of the input data to a target and source credentials 480. For instance, the access manager compares the input data credential to the corresponding credential in the target and source credential 480 and allows processing to continue if they match. In other cases, an encryption code from the target and source credentials 480 is used with the input data encryption key to decrypt the input data.

The input controller 415 receives and filters HTTP(s) requests and responses from the institutes 115, the data services 280, and the chronicle platform 105. The input controller 415 stores the data from the HTTP(s) requests and responses in a source cache 420 and waits until all data to be transformed is received and stored in source cache 420. The input controller 415 then sends the filtered response to a workflow processor 470 once all data is cached and ready to be transformed. For instance, when the extension service 135 sends an HTTP(s) response containing embedded extension data, the input controller 415 filters the HTTP(s) response to strip the embedded extension data, stores the data, checks to makes sure the data is complete, and sends the filtered response to workflow processor 470.

The workflow processor 470 manages all processes and interactions in the integration framework 110. The workflow processor 470 receives filtered requests and responses from the input controller 415. The workflow processor 470 calculates the mapping index and the session index necessary to transform the source data format to the target data format. The workflow processor 470 starts the process of transforming source data formats to target data formats by instructing a repository server 435 to retrieve mapping and session data relating the source data format to the target data format. The repository server 435 retrieves the mapping and session data and passes it to a load manager 440. The mapping maps the source data format to the target data format. The session is a set of instructions that describe how and when to transform the source data format to the target data format. The integration framework 110 passes data from data services 180 to the chronicle platform 105 after it has transformed the data.

The load manager 440 validates the source and target by accessing the target and source credential 480 and only continues the process of transforming the data if there is proper validation. The load manager 440 triggers a transform manager 445 to transform the source data format to the target data format using the mapping and the session. For instance, when a source sends data in CSV format and the target requires the data in a text file, the session instructs the transform manager 445 how and when to convert from CVS to text and the transform manager 445 uses the mapping to map CVS fields to text fields. The transform manager 445 sends transformed data to a target cache 460 until all data is transformed. Once the target cache 460 contains all of the transformed data, an output controller 455 embeds the transformed data into an HTTP(s) response or request. In some cases, for example, the output controller 455 embeds the data using JSON or XML. The output controller 455 sends the HTTP(s) response to the target.

Figure 5:
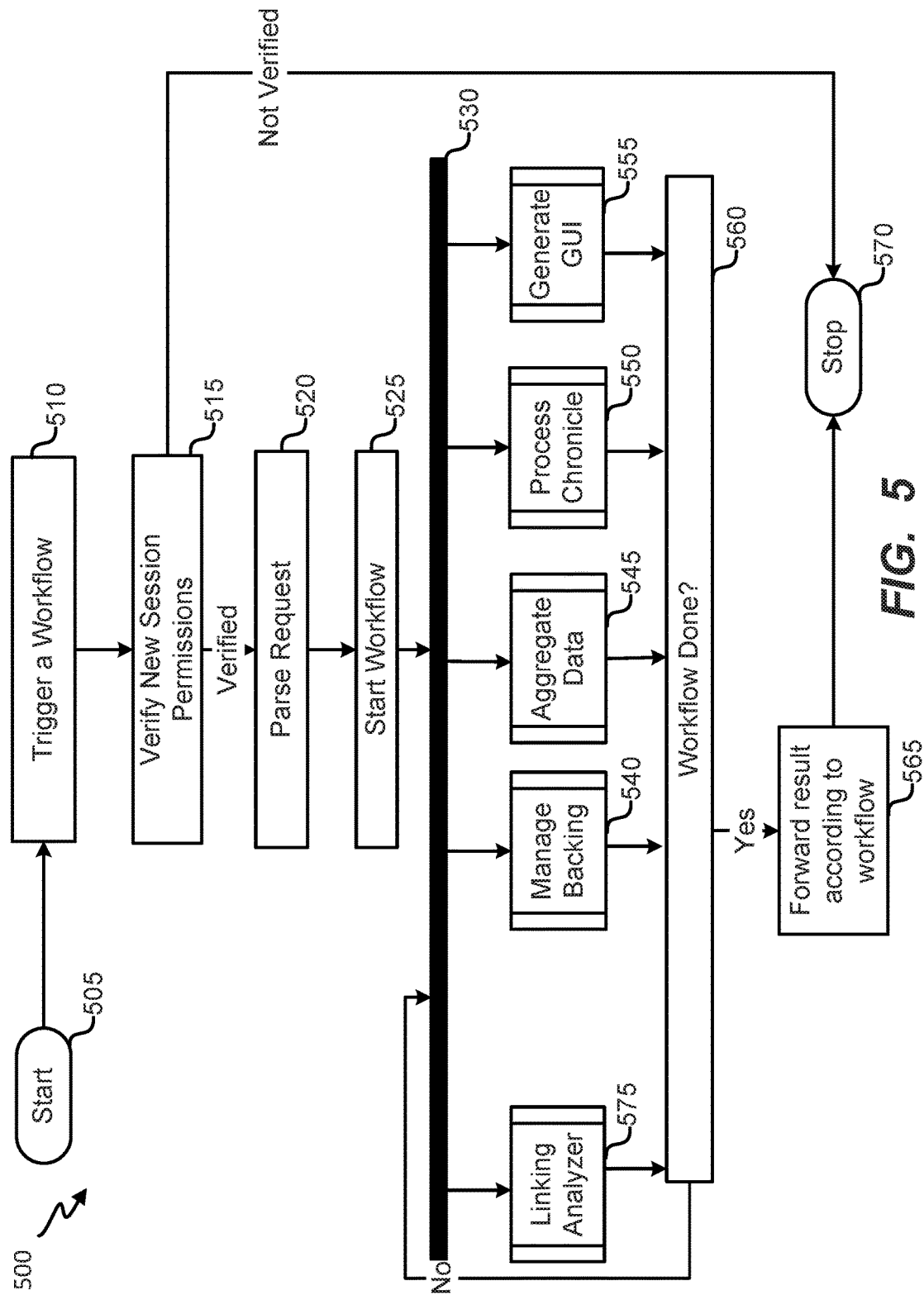
FIG. 5 illustrates a flowchart of instigating a workflow in the chronicle platform.

FIG. 5 illustrates a flowchart of an embodiment of a process 500 for instigating a workflow in the chronicle platform 105. The process starts at block 505 when an event triggers a first workflow as shown in block 510. Any number of events occurring internal to the chronicle platform 105 and external to the chronicle platform 105 can trigger the first workflow in any number of ways. Each of the GUI generator 375, the data aggregator 380, the chronicle processor 385, the backing processor 390, the linking processor, and the version generator 395 will, in some cases, trigger a second workflow while in the midst of processing the first workflow. For instance, the chronicle processor 385 can trigger the second workflow when it calculates and/or detects a predetermined condition such as receiving data from data services 180, and the data aggregator 380 can trigger a third workflow when it calculates and/or detects a value that falls into a predetermined range, such as when the aggregate value of an end-user's annual returns are below a specified level. And, for instance, when the institutes 115 make any request related to processing the resource request they trigger a fourth workflow. The access framework 370, in some (but not other) instances, must verify credentials and permissions for the first workflow as shown in block 515. The access framework 370 can use any number of methods to verify credentials and permission including comparing credentials to those stored in institute credentials 355. If the access framework 370 cannot verify the credentials and permissions, the first workflow stops as shown in block 570. The data processor 360 filters the external HTTP(s) requests and responses for the first workflow request before the workflow manager 325 parses the request as shown in block 520.

The processes generate GUI 555, aggregate data 545, process chronicle 550, manage backing 540, entity analyzer 575, and the version generator 535 are all connected to a synchronization bar 530. The workflow manager 325 synchronizes the GUI generator 375, the data aggregator 380, the chronicle processor 385, the backing processor 390, linking processor 392, and the version generator 535 as shown in the synchronization bar 530 using processes generate GUI 555, aggregate data 545, process chronicle 550, manage backing 540, entity analyzer 575, and the version generator 395. The workflow manager 325 calculates which of the processes generate GUI 555, aggregate data 545, process chronicle 550, manage backing 540, entity analyzer 575, and the version generator 535 can run simultaneously and which must wait for the output of another processes. The workflow manager 325 initiates each process accordingly. For example, at block 545, the data aggregator 380 can aggregate data for a given request that may include content objects, data composite values and/or processing results pertaining to a single request or to multiple requests. The chronicle processor 385 can organize the data to generate or update a chronicle corresponding to the request at block 550, and the chronicle processor 385 can process the data from a chronicle to identify missing content objects and/or data (e.g., composite values and/or processing results), whether one or more values satisfy a given condition (e.g., exceed one or more thresholds in one or more defined directions), a status of one or more content objects or resource memorandum, and so on. At block 555, the GUI generator 375 can generate one or more GUIs based on the processing (e.g., to identify missing content objects or data, present an alert of missing data, present a processing alert and/or convey a status). At block 575 the entity analyzer process can compute the networked-grouping and networked-grouping clusters as well as analyze outcome score based on the networked-grouping.

As shown in the workflow done block 560, when each process is finished the workflow manager 325 computes whether the GUI generator 375, the data aggregator 380, the chronicle processor 385, the backing processor 390, and the version generator 395 processes are complete or if there are processes that still need to be initiated. The workflow manager 325 continues to check if everything is complete at block 560 until all processes in the first workflow are complete. Any number of iterations of starting a new process can happen in block 560 since any of the processes generate GUI 555, aggregate data 545, process chronicle 550, manage backing 540, entity analyzer 575, and the linking analyzer 575 can trigger a successive workflow. Once there are no more processes to initiate, the workflow manager 325 computes the destination of where it should route the result of the first workflow and forwards it there as shown in box 565. The workflow stops as shown in block 570. Once the first workflow is triggered as shown in block 510, the process 500 for processing a resource request can start again at block 505 if a second workflow or successive workflow is triggered even if the first workflow has not reached block 570 since the workflow manager 325 controls the synchronization as shown in synchronization bar 530.

Figure 6:
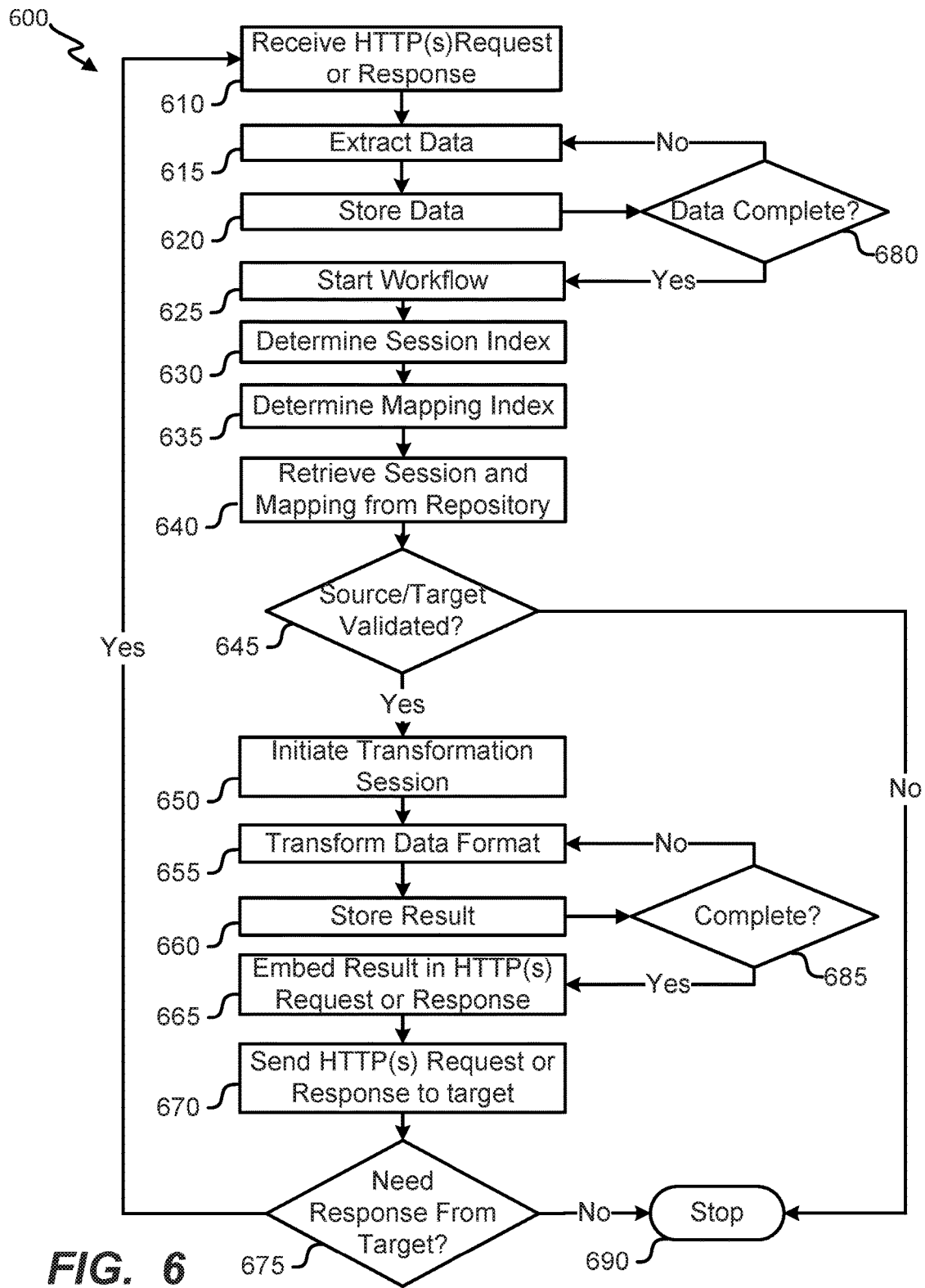
FIG. 6 illustrates a flowchart of the embodiment of a process 600 for transforming the source data format to the target data format.

FIG. 6 illustrates a flowchart of the embodiment of a process 600 for transforming the source data format to the target data format. The data interface 365 and the user interface 320 on the chronicle platform 105 receive and transmit data in a first predetermined format. The integration platform 110 executes the process 600 for transforming the source data format to the data format configuration of the data interface 365 and the user interface 320 on the chronicle platform 105 received from the institutes 115 and the data services 180. Conversely, the data services 180 receives and transmits data in a second predetermined format and the institutes 115 transmit and receive data in a third predetermined format. The integration platform 110 also executes the process 600 for transforming the source data format to the target data format for data received by the institutes 115 and the data services 180.

Block 605 shows the start of the process 600 for transforming the source data format to the target format data. The input controller 415 on integration framework 110 receives the HTTP(s) request or response as shown in block 610. The input controller 415 extracts the data from the HTTP(s) as shown in block 615 and stores it in the source cache 420 as shown in block 620. The input controller 415 then checks to make sure that it has received all of the source data as shown in decision block 680. If the input controller 415 has not stored all of the source data it starts the extraction process again as shown in block 615. The input controller 415 will continue to check to make sure it has stored all of the source data in source cache 420 until none is remaining to store, and then the workflow processor 470 starts the workflow as shown in block 625. The workflow processor 470 calculates the session index and the mapping index as shown in blocks 630 and 635 and passes the session index and the mapping index on to the repository server 435. The repository server 435 retrieves the session from the session repository and the mapping from the mapping repository as shown in block 640. The mapping maps the source data format to the target data format. The session is a set of instructions that describe how and when to move the source data format to the target data format.

The load manager 440 validates the target and source credentials as shown in block 645 by matching them to the target and source credentials 480. If the load manager 440 cannot validate the target and source credentials the transformation process stops as shown in block 690. If the load manager 440 validates the target and source credentials it initiates the transformation session as shown in block 650 by triggering the transform manager 445 to start transforming the source data format. The transform manager 445 uses the mapping and the session to transform the source data format for data in the source cache 420 to the target data format as shown in block 655. The transform manager 445 stores the transformed data in the target cache 460 as shown in block 660. The transformation manager then checks to make sure that it has transformed and stored all of the data from the source cache 420, as shown in decision block 685. If the transform manager 445 has not transformed and stored all of the data from the source cache 420, it continues to transform the source data format as shown in block 655 and stores transformed data in the target cache 460 as shown in block 660.

The transform manager 445 iteratively checks to make sure it has transformed all of the data as shown in 685 and stored all of the transformed data in the target cache 460 as shown in blocks 655 and 660. The output controller 455 then embeds the data in the HTTP(s) request or response as shown in block 670 and transmits the data to the target. The workflow processor 470 then determines if the HTTP(s) request or response requires a response as shown in decision block 675 and generates instructions for the input controller 415. One such instance would be when the integration platform 110 sends a request for data from the data services 180. In that case integration platform 110 would need the data from the response from the data services 180 that contains the data it requested. If no response is required, the process 600 for transforming the source data format to the target data format is over as depicted at the block 690. The input controller 415 receives the HTTP(s) response as shown in block 610 if the decision block 675 makes is affirmative and the workflow processor 470 will start the transformation process from block 615 and proceed until it reaches block 690 and stops.

Figure 7:
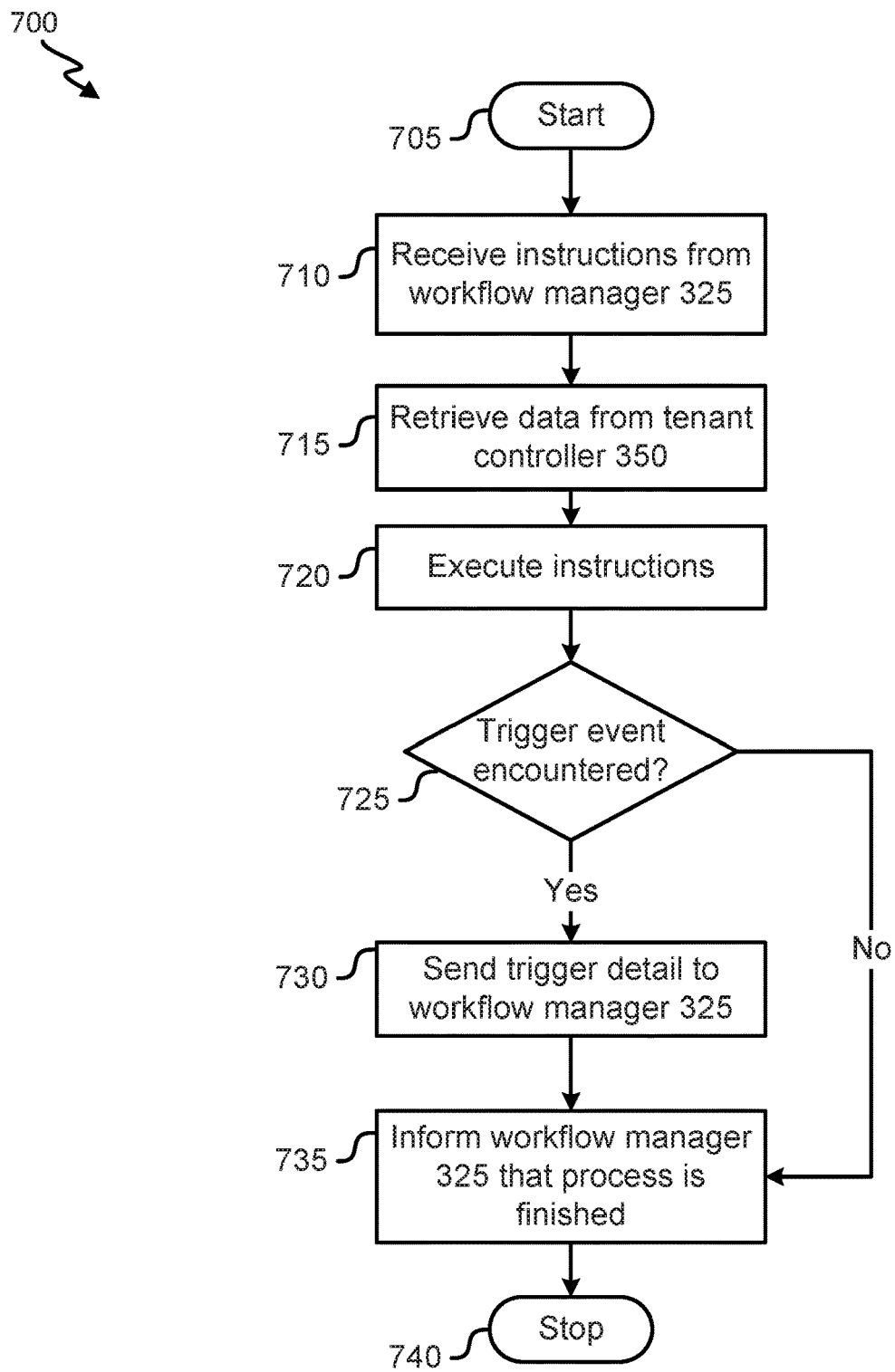
FIG. 7 illustrates a flowchart of the embodiment for processing a chronicle.

FIG. 7 illustrates the flowchart of an embodiment of a process 700 for chronicle processing. When the workflow manager 325 detects a trigger to process a chronicle (in full or in part), it creates the instructions the chronicle processor 385 needs and sends them to the chronicle processor 385 as shown in block 710. The chronicle processor 385 retrieves the data it needs to process the chronicle, such as a credit report from extension service 135, as shown in block 715. The chronicle processor 385 executes the instructions as shown in block 720. At block 725, it is determined whether processing the chronicle according to the instructions causes another triggering event. If so, the chronicle processor 385 sends the trigger detail to the workflow manager 325 as shown in block 730. Upon completion of sending the trigger detail or determining that another triggering event has not been encountered, the chronicle processor 385 informs the workflow manager 325 that it has finished as depicted in block 735. The process 700 is finished as shown in block 740. This flow chart is the same for performing GUI Generator 375, Data Aggregator 380, Backing Processor 390, or Entity Processing 392 as pictured in FIG. 3.

Figure 8:
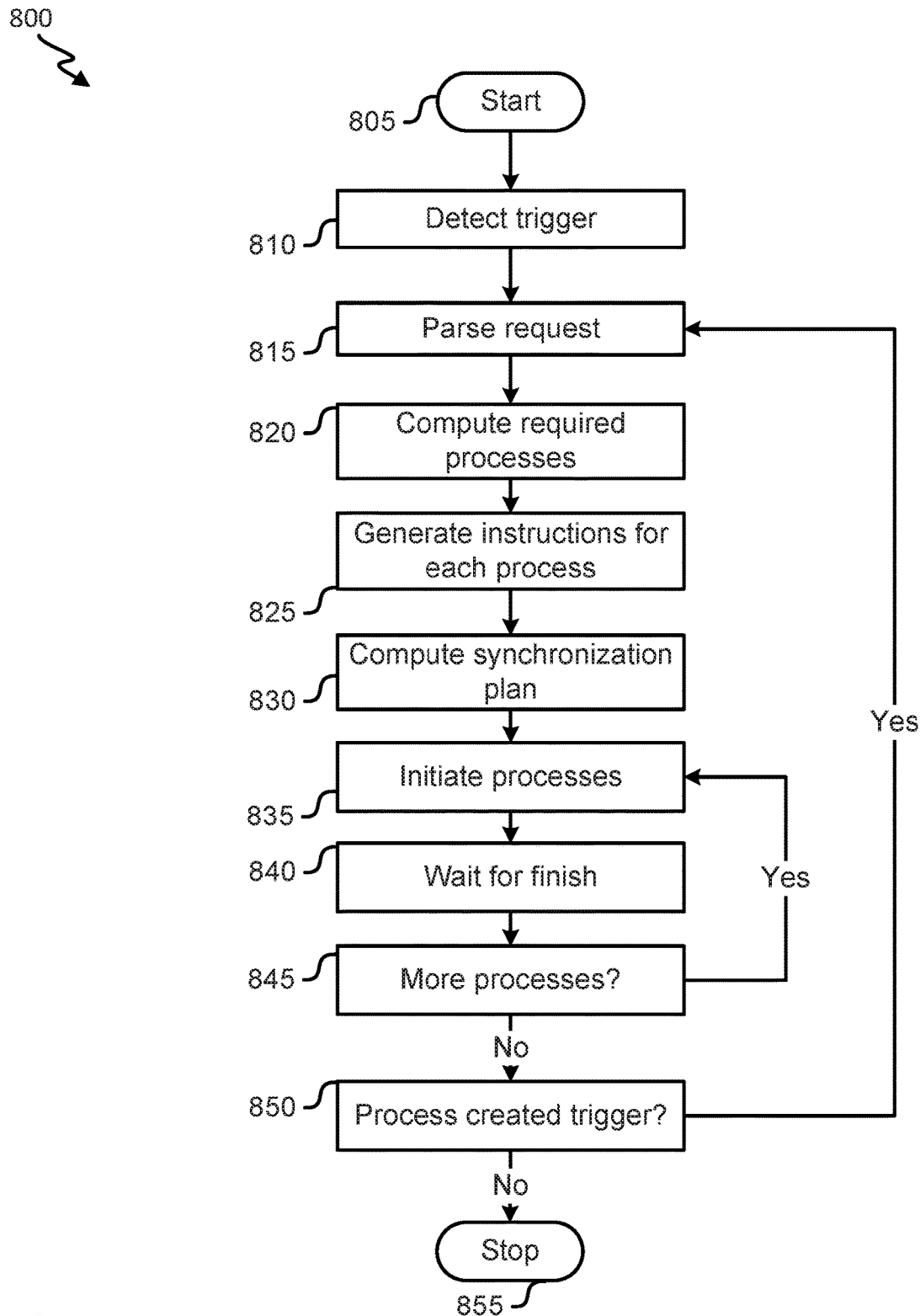
FIG. 8 illustrates the flowchart of the embodiment of a workflow manager processing a workflow.

FIG. 8 illustrates the flowchart of an embodiment of a process 800 for workflow management. When the workflow manager 325 detects a trigger to process a workflow request as shown in block 810, it parses the workflow request as shown in block 815. Because the workflow manager 325 detects triggers generated by processes internal to the chronicle platform 105 and external to it from institutes 115 and/or data services 180, the workflow manager 325 parses triggers from both sources. Once parsed, the workflow manager 325 computes which of the GUI generator 375, the data aggregator 380, the chronicle processor 385, the backing processor 390, the linking processor 392 and the version generator 395 processes are needed to resolve the workflow request as shown in block 820.

For each of the processes needed to resolve the workflow request, the workflow manager 325 generates a set of instructions as shown in block 825. The workflow manager 325 then computes a synchronization plan as shown in block 830. For instance, if the workflow request is to capture a version of the resource memorandum, the workflow manager 325 is to start the chronicle processor 385 before starting the version generator 395. There are processes that can run simultaneously, for instance the GUI generator 375 can simultaneously process the presentation for reporting receiving a credit report while version generator 395 captures the second version of the resource memorandum. The workflow manager 325 initiates the process according the synchronization plan as shown in block 835. The workflow manager 325 waits for the initiated processes to finish as shown in block 840. Once the initiated process report they are finished, the workflow manager 325 then determines if more processes are to be initiated as shown in block 845. The workflow manager 325 initiates those processes as shown in block 835. This might occur, for instance, if the chronicle processor 385 executes instructions that fill the chronicle with all required content objects to trigger a report to institutes 115 an to capture a version of the resource memorandum. Once there are no processes left to initiate, the workflow manager 325 detects new triggers that the processes generated as shown in block 850. If the workflow manager 325 detects triggers it parses those workflow requests as shown in block 815 and repeat the process 800 until there are no processes to initiate and no triggers detected as shown in in block 855.

The data services 180 include any number of third party services providing data to the chronicle system 100 including a pricing service, an extension service, a geography service, a tax service, an appraisal service, an identification service, a watchdog service, a background service, a benchmarking service, and a document service. The data services 180 send the service data to integration framework 110. The data services 180 retrieve data from a number of reporting services. For example, the pricing service retrieves data from sources including PrecisionLending™, and the extension service retrieves data from reporting services including CBC Innovis™ and Dunn and Bradstreet™. The geography service retrieves data from reporting services that include FEMA's Flood Map Services Center. The tax service retrieves tax data from reporting services, including, for example, city, county, state, and federal taxing authorities. And the appraisal service retrieves data from reporting services, including, for example, city, county and state appraisal agencies and Kelly Blue Book™. The identification service uses reports from services like Moody'S™, Westlaw™, and LexisNexis™ are included in the reporting services that provide data to the watchdog service. One of the sources used by the background service is Equifax Business Connect™. The benchmarking service obtains reports from, for example Reuters™ RNA. The document service uses FIS FLO™ and LaserPro™ providers, among others. A resource as described here can be a product such as a loan, a mortgage, a credit extension, a special account, an annuity, a life insurance policy, or any other financial instrument. An institute as described here can be any provider of a resource such as bank, credit union, or financial services company. A delegate agent as described here can be a resource officer. An approval agent as described here can be a resource approver. A deception agent as described here can be fraud detector. An reviewer agent as described here can be a resource reviewer. An eavesdropper agent as described here can be an auditor. An exposure agent as described here is a risk evaluator. A representative agent as described here can be a bank teller. An end-user or target entity as described here can be a resource requestor. A watchdog agent as described here can be a regulatory agent. An eavesdrop agent as described here can be an outside auditor. An outcome score as described here can be a level of risk associated with providing a resource. A relationship as described here can be a direct one such as familial or those connected by a legal obligation. It can be indirect such as occupational or by use of the same or similar resources.

In some embodiments described, a networked-grouping may be dynamically generated and updated based on detection of manual input and/or documentation pertaining to existing and/or potential resources and resource requestors. An institute 115 may identify a target resource user's relationship to one or more other resource users and/or resources. Some relationships may be direct, such as familial or occupational relationships (e.g., two entities share a relationship link). Some relationships may be indirect via one or more resource users or resources. For example, a first resource user may be related to a second resource in that the two share a joint resource. Furthermore, an institute 115 may be given the ability to adjust the elements to be included within a networked-grouping by adjusting a depth, or degree of relation, of a networked-grouping. For example, a networked-grouping with a depth of one may include only those elements (resource users and/or resources) that are directly related to the target resource user. If the networked-grouping's depth is increased from one to two, the networked-grouping may be updated to include those elements that are within two relationship links of the target resource user as well. In some embodiments, a rule or institute 115 input can be used to determine which resource users are to be reflected in a networked-grouping.

Some embodiments described in the current disclosure may be directed to providing an outcome score assessment for a target resource requestor. A target entity can be a resource requestor or a resource user in some cases. For example, the disclosure provides a technique for assessing an outcome score associated with a particular resource requestor and resource based at least in part on a relationship structure associated with the resource requestor. An institute may be able to request that a networked-grouping be generated for a target resource requestor, resource user, or resource and may be provided with information pertaining to those relationships. In some embodiments, the institute 115 may then be better able to assess one or more outcome hazards associated with a resource requestor, resource user, and/or resource and use this assessment to estimate an outcome score of fulfilling a resource request. An outcome score can then be generated for the resource request based on attributes of the combined relationship. In some embodiments, the outcome score may be calculated to factor in a relationship role and/or an outcome score associated with relationships within the networked-grouping.

Additionally, the disclosure of the chronicle system 100 discusses a technique of grouping a networked-grouping associated with a resource requestor, resource user, and/or resource with other networked-groupings that are similarly situated (e.g., have a similar relationship structure, have similar attributes, etc.) and making an assessment with respect to the group. For example, an institute 115 may assign various weight values to particular attributes of a networked-grouping or elements of a networked-grouping and may subsequently utilize a clustering algorithm to cluster the networked-grouping into a group of networked-groupings. Once clustered, the institute 115 may assume that each networked-grouping within the cluster is similarly situated and would have similar outcome hazards and/or resource preferences. To determine an outcome score associated with a particular resource for one of the entities of a networked-grouping, the institute 115 may then analyze other members of the cluster that are currently associated with the resource.

By way of illustrative example, consider the following. Upon receiving a request for a new resource, the institute 115 may construct a networked-grouping associated with the potential resource requestor. In some embodiments, the networked-grouping itself may be analyzed to determine an outcome score based on the networked-grouping's outcome hazard. In some embodiments, the networked-grouping may be clustered with similar networked-groupings. Once clustered, the institute 115 may identify other members of the cluster that are currently associated with, or have been associated in the past with, a resource similar to the one being considered. The institute 115 may then calculate an outcome score associated with providing the new resource to the resource requestor based on data from other similarly situated resource recipients.

In some embodiments, the disclosure may be directed to providing a resource placement recommendation for a resource requestor or resource user. For example, the institute 115 may determine that a majority of networked-groupings within a group or cluster are associated with a particular resource. Because the networked-groupings have similar resource preferences, it may be likely that the networked-groupings within the group that are not associated with the particular resource may be interested in the particular resource. For example, the institute 115 may identify that 80% of the entities associated with networked-groupings in the group have a particular resource. The institute 115 may then determine that the remaining 20% of entities associated with networked-groupings may be interested in a similar resource. In some embodiments, the institute 115 may provide this recommendation to an institute agent. In some embodiments, the institute may identify relationship structures that are common to resource ownership in order to identify potential consumers of the resource. For example, the institute 115 may identify, and generate networked-groupings for, each owner of a particular resource. In this example, the institute 115 may identify commonalities in relationship structures between the different networked-groupings in order to determine a relationship structure that is potentially correlated to the particular resource. Once a potentially correlated relationship structure has been identified, the institute 115 may recommend the particular resource to other entities based on their association with a similar relationship structure.

Figure 9:
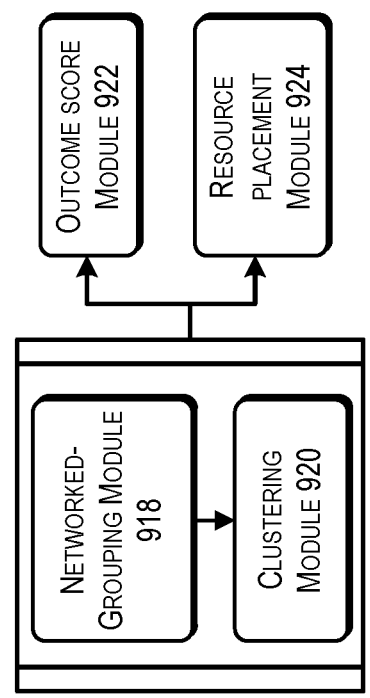
FIG. 9 depicts a diagram that illustrates an example of an linking processor in one embodiment of the present invention.

FIG. 9 is a block diagram of linking processor 392 in accordance with at least some embodiments, In linking processor 392, a networked-grouping module 918 may query one or more institute store 330, aggregator store 335, profile store, and object store 345 to construct a networked-grouping related to a particular resource requester, resource user, or resource. For example, the institute 115 may identify each entity relationship associated with the current resource requestor and construct a separate dataset containing those entities. In some embodiments, the networked-grouping module 918 may assign a weight value to each relationship entity identified. The weight value may be assigned based on the type of relationship, an outcome score associated with the relationship, a relevance of the relationship, or any other suitable factor or combination of factors. In some embodiments, various weights may be set by a user. The networked-grouping module 918 forms a networked-grouping from the identified entity relationships.

Some embodiments of the current disclosure may include a clustering module 920 configured to employ one or more clustering techniques. In these embodiments, networked-groupings may be assigned to the nearest centroid (cluster center) to form clusters of networked-groupings. This will be described in greater detail below. By assigning networked-groupings to clusters in this fashion, the institute 115 may be able to identify those networked-groupings most similar to each other. This may, in turn, provide a more accurate assessment of outcome hazards associated with a networked-grouping (or entity within the networked-grouping) by enabling an assessment of similarly situated networked-groupings.

In some embodiments, the networked-grouping data may be further processed by an outcome score module 922 and/or a resource placement module 924. An outcome score module may be used to evaluate an outcome score related to a particular networked-grouping (or entity within the networked-grouping) and a resource. For example, the outcome score module 924 may be used to evaluate the outcome score associated with providing a particular resource requester with a resource. In embodiments in which the current networked-grouping has been clustered with other networked-groupings, the outcome score module may evaluate default rates with respect to other members of the cluster to determine an appropriate default rate for the current networked-grouping. In at least some embodiments, a resource requester's relationships may be analyzed in order to determine the outcome score of fulfilling a resource request. The institute 115 may maintain one or more rule sets that are associated with particular requests. In some embodiments, the rule set may contain weights to be assigned to specific relationship roles, with a weight of zero being assigned to roles that have no relevance to the request. In at least some embodiments, a rule set or predetermined configuration may specify that a relationship is to be treated in a particular fashion when assessing the outcome hazard.

In embodiments that include a resource placement module 924, networked-groupings may be evaluated with respect to resource recommendations. For example, if a particular networked-grouping outcome score ratio, then the institute 115 may recommend one particular resource over another. In embodiments that include a clustering module 920, the institute 115 may identify one or more resources that are commonly included in other members of the cluster and recommend that resource for a networked-grouping that does not currently include the resource. For example, if the institute 115 identifies that 80% of members of a particular cluster include a particular resource, then the institute 115 may determine that the remaining 20% of the cluster's members might also be interested in that resource. In this example, the institute 115 may recommend the resource to the cluster members who do not include the resource.

Figure 10:
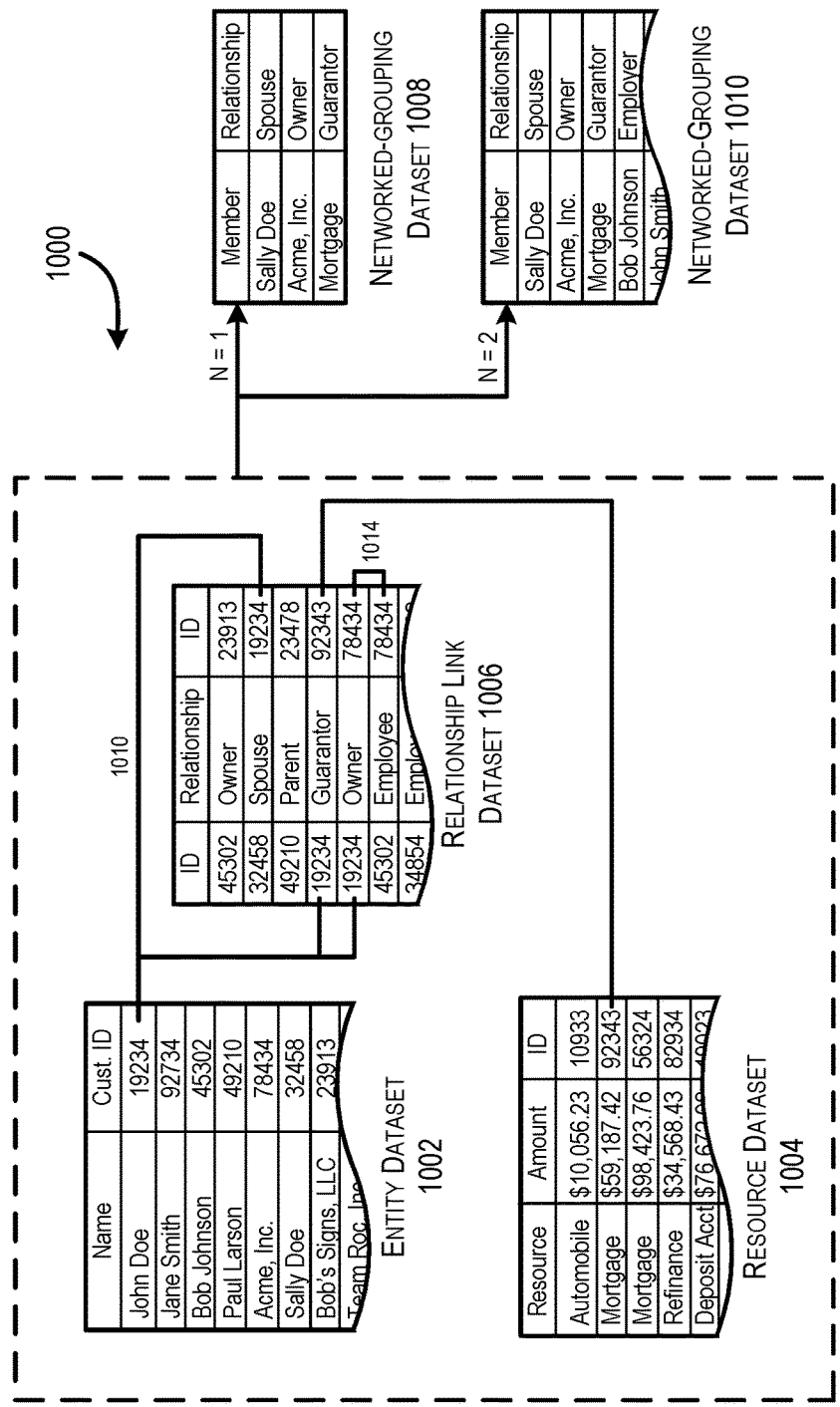
FIG. 10 depicts an illustrative example relational database structure that may be implemented in accordance with at least some embodiments.

FIG. 10 depicts an illustrative example relational database structure 1000 that may be implemented in accordance with at least some embodiments. Although a relational database structure is depicted in FIG. 10, some embodiments of the disclosure may employ other data storing/structuring techniques. In database structure 1000, an entity dataset 1002 is depicted as storing records associated with entities that are resource requestors or resource users.

In addition to an entity dataset 1002, database structure 1000 depicts a resource dataset 1004 storing records associated with resources. Although entity data and resource record data are depicted in this illustrative example as being stored in separate datasets, some embodiments of database structure 1000 may include entity records and resource records in a single dataset.

In at least some examples, database structure 1000 may also include a relationship dataset 1006 storing roles and reverse roles related to various entities and resources. For example, the relationship dataset 1006 may store an indication that an entity or resource is related to another entity or resource.

In accordance with at least some embodiments, the institute 115 may construct networked-groupings using information stored in database structure 1000. In some embodiments, networked-grouping information determined from datasets 1002, 1004, and 1006 may be stored in a separate networked-grouping dataset 1008. For the purposes of this disclosure, N is used to represent a depth. For example, by setting a depth of one (N=1) the institute 115 may identify only those elements that are directly related to the target, in that there exists a relationship link associated with both the target and the element. By adjusting the depth of the networked-grouping to two (N=2), the networked-grouping may be expanded to include all elements that are within two relationship links of the target.

Figure 11:
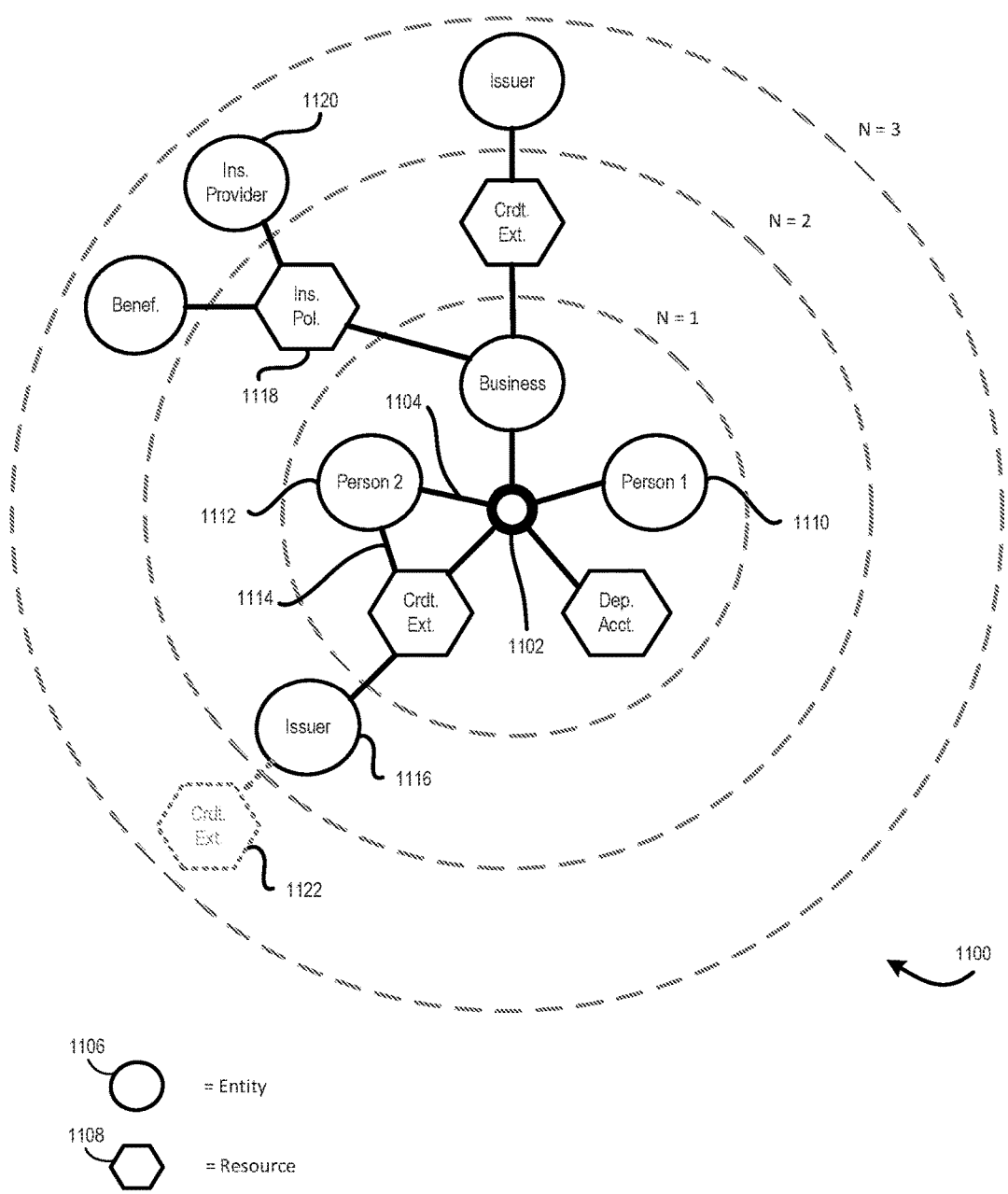
FIG. 11 depicts an illustrative example interconnect web structure that may be implemented in accordance with at least some embodiments.

FIG. 11 depicts an illustrative example interconnect web structure 1100 that may be implemented in accordance with at least some embodiments. In at least some embodiments, information provided by one or more modules of the linking processor 392 may be presented as an interconnect web similar to the one depicted with indications of entities and/or resources associated with a networked-grouping. For example, any one of institute 115 agents may submit a request related to a particular entity or resource, referred to as the target 1102, which is depicted here as being at the center of the interconnect web. In FIG. 11, the target 1102 is depicted as having links 1104 with other entities 1106 and/or resources 1108. In FIG. 11, entities 1106 are represented as circles and resources 1108 are represented as hexagons.

In this illustrative example, each entity may be further associated with a role or type of relationship. Any number of attributes related to Person 1 may be depicted on the interconnect web. For example, Person 1 (1110) may actually be the spouse of the target entity 1102. Additionally, any number of attributes related to Person 1 may be depicted on the interconnect web. For example, Person 1's name may be displayed instead of "Person 1." In some embodiments, entities and resources may also have additional relationships outside of those stemming from the target entity 1102. For example, Person 2 (1112) may be a child of the target entity and the target entity may be a guarantor of a loan extended to Person 2. In this example, relationship link 1114 may represent the borrower relationship between Person 2 and the loan. It should be noted in this example that the relationship link between Person 2 and the loan is created in lieu of duplicating either Person 2 or the loan. In this example, the institute 115 is able to identify that one or more elements of the interconnect web are already present and prevent duplication. In some embodiments, elements within the interconnect web may be moved in order to facilitate linking between elements.

In at least some embodiments, the institute 115 or institute agent is able to adjust a depth associated with the networked-grouping. For example, the institute 115 may adjust the depth of the networked-grouping from N=1 to N=2. This increase to the depth of the networked-grouping would potentially expose additional entities 1116 and/or resources 1118 related to the target 1102. By adjusting the depth further, from N=2 to N=3 for example, additional entities and/or resources 1120 may be further exposed. However, even in embodiments in which the depth does not have an upper limit, some entities and/or resources 1122 may not be relevant to the target 1102. For example, a loan issuer 1110, in addition to providing a loan 1108 to the target 1102, may also provide loans 1122 to unrelated entities. In these cases, the institute 115 may determine that the loanee is not related to the target 1102 and may not add the loan 1122 to the networked-grouping. In some embodiments, the institute 115 may be provided with the ability to sever, or manually remove, entities and/or resources from the networked-grouping via the interconnect web 1100.

In at least some embodiments, a user or administrator may be able to select an entity or resource other than the target 1102 in order to generate a new interconnect web related to that entity or resource. For example, the institute 115 viewing the interconnect web depicted in FIG. 11 may select Person 1 by clicking on that entity in the interconnect web, or otherwise indicating that he or she is interested in Person 1. In response, the institute 115 may generate a networked-grouping from relationships associated with Person 1, which may be illustrated in a second interconnect web.

In at least some embodiments, generation of a networked-grouping may be dictated by a rule set or predetermined configuration. The institute 115 may maintain one or more rule sets that are associated with particular requests. In some embodiments, the rule set may contain weights to be assigned to specific relationship roles, with a weight of zero being assigned to roles that have no relevance to the request. For example, the institute 115 may maintain a rule set for loan requests that specifies which entities, resources, and relationship roles are relevant to a loan request. By way of further example, a loan request rule set may specify that a parent relationship should be given no weight unless the associated child is also related to the parent via another resource. In this example, children of an entity requesting a loan may not be added to the relationship aggregate or depicted via an illustration of the relationship aggregate.

Figure 12:
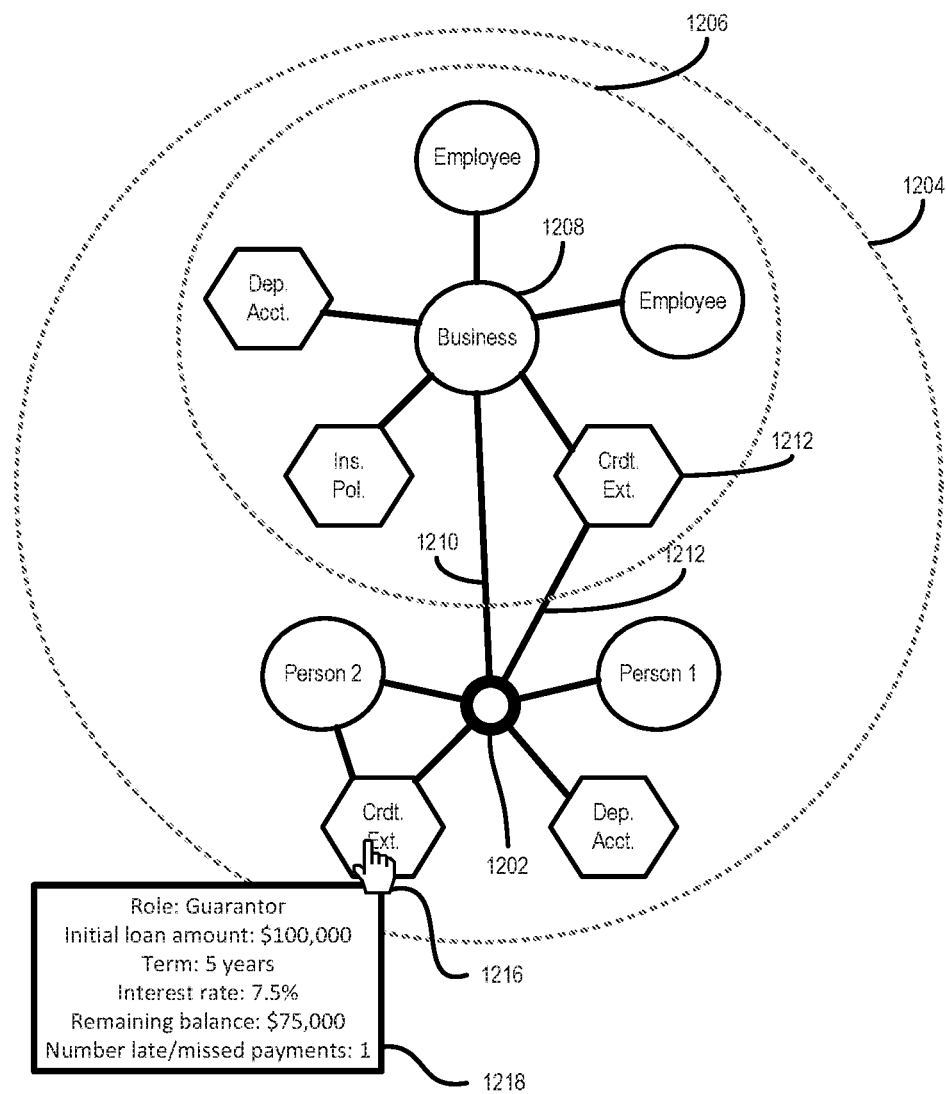
FIG. 12 depicts an illustrative example aggregate networked-grouping, as illustrated via an interconnect web that may be implemented in accordance with at least some embodiments.

FIG. 12 depicts an illustrative example aggregate networked-grouping, as illustrated via an interconnect web that may be implemented in accordance with at least some embodiments. In FIG. 12, a relationship structure has been created for a target entity 1202. As depicted in the illustration, the entities and resources related to the target entity 1202 may belong to a networked-grouping 1204. As is also depicted in this illustration, networked-grouping 1204 may be an aggregate networked-grouping in that it may include another networked-grouping 1206 created for a separate entity 1208. Additionally, the target entity 1202 may share multiple relationship links with entities included in the networked-grouping 1206.

In accordance with at least some embodiments, a graphical user interface may be configured to display additional information related to one or more elements of the interconnect web. For example, a user may move a cursor 1216 over an element to expose metadata 1218 related to that element. For example, the metadata 1218 may include any suitable information related to the element.

Figure 13:
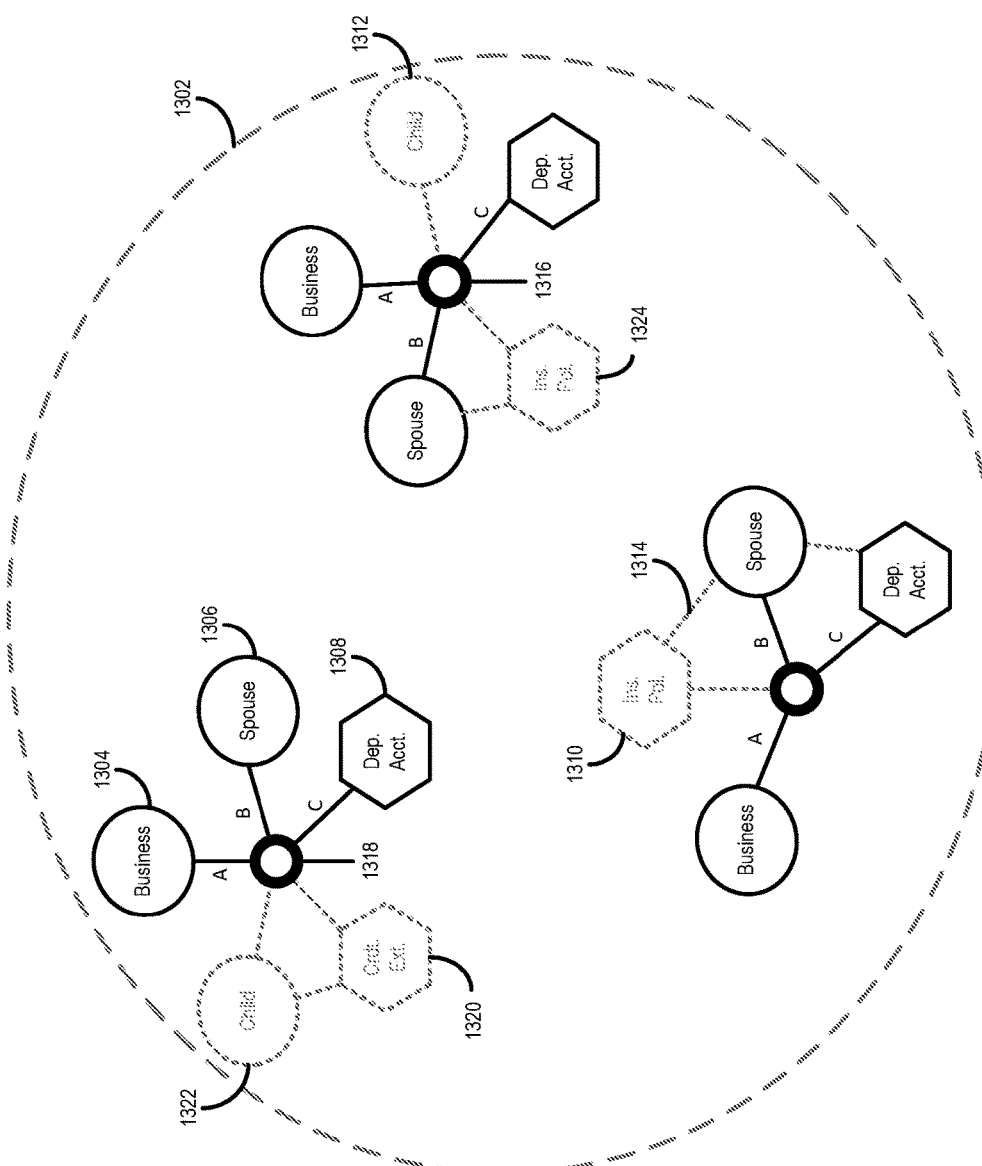
FIG. 13 depicts an illustrative example networked-grouping technique that may be implemented in accordance with at least some embodiments.

FIG. 13 depicts an illustrative example networked-grouping aggregation technique that may be implemented in accordance with at least some embodiments. In FIG. 13, a grouping 1302 of networked-groupings having similar relationship structures is depicted. To create grouping 1302, a institute 115 may identify particular elements (entities, resources, or relationship types) that should be present in a networked-grouping to be included in the grouping.

Once a grouping 1302 has been created, various analyses may be performed with respect to networked-groupings within the grouping. As the requirements for belonging to the grouping 1302 become more specific, the entities may be assumed to have more in common. An outcome score associated with one entity in the grouping 1302 is then more likely to apply to other entities within the grouping 1302. In some embodiments, the institute 115 may assess entities and resources within the grouping in the aggregate.

In some embodiments, the institute 115 may provide resource recommendations related to one or more entities. For example, for grouping 1302, the institute 115 may determine that a majority of entities are associated with a particular resource and that the entities not associated with the resource may be interested in the resource.

In some embodiments, the institute 115 may receive a request related to a particular resource and may determine a relationship structure associated with the resource. The institute 115 may determine that other networked-groupings with the same relationship structure may be interested in the resource and may recommend the resource accordingly. In some embodiments, the institute 115 may then identify an entity associated with a networked-grouping that has the common relationship structure and is not currently associated with the resource. Once identified, the institute 115 may provide a recommendation for resource to the relevant entities.

Figure 14:
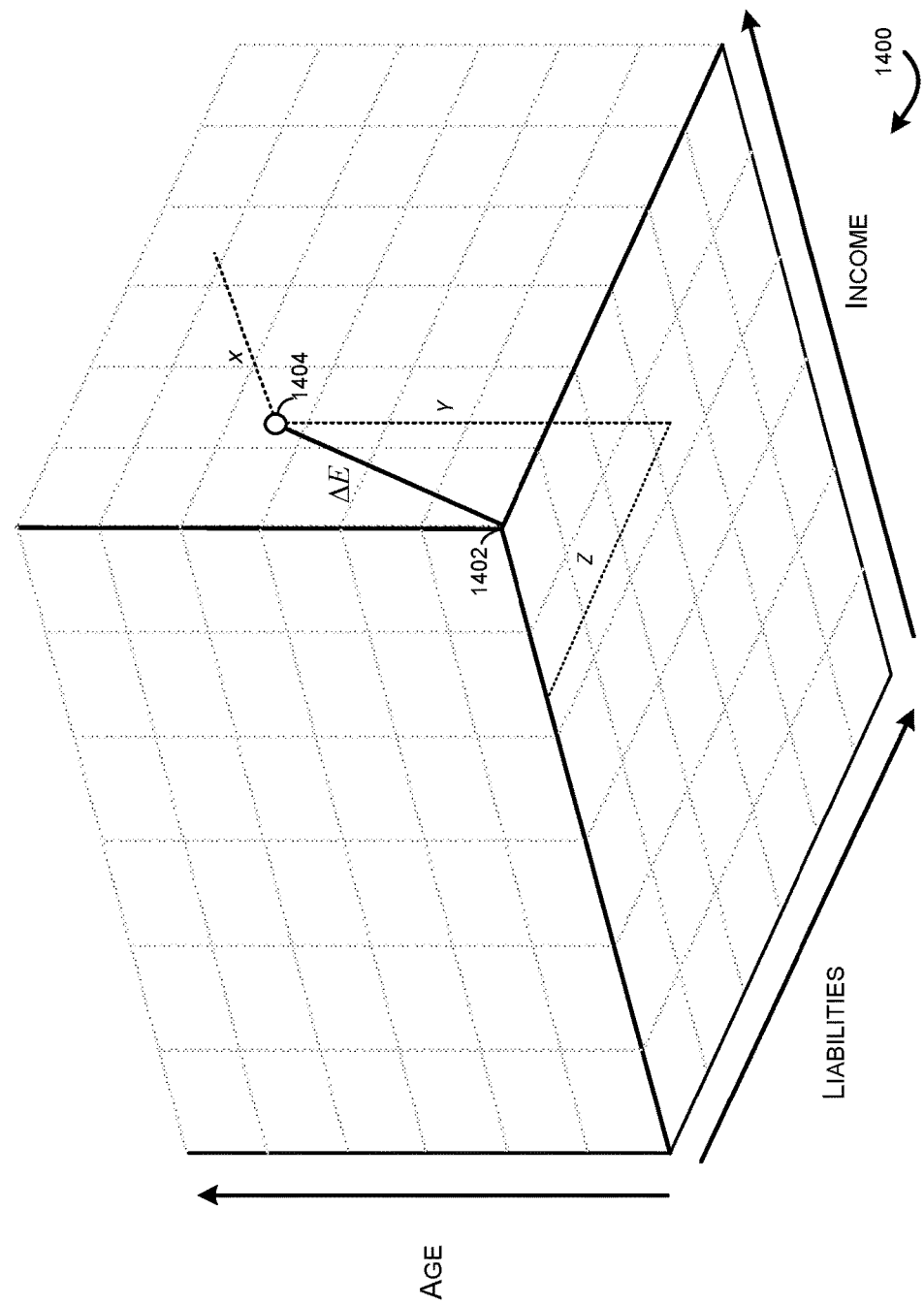
FIG. 14 depicts an illustrative example method of determining a difference, or distance between, multiple entities.

FIG. 14 depicts an illustrative example method of determining a difference, or distance, between multiple entities.

In FIG. 14, a three dimensional graph 1400 is depicted with the axes comprising various attribute values. For example, attribute values may range in integer values from zero to any positive value for each of the axes. Additionally, one or more attribute values may be weighted. For example, an entity's attribute along a particular axis may be multiplied by a weight from zero to one in order to adjust the importance of that factor in determining a distance between two entities. Although a three dimensional space is depicted in the current illustration, it should be recognized that a distance between two entities may be calculated based on any number of attributes. For the purposes of this disclosure, the distance between two entities in a multi-dimensional space will be referred to as $\Delta E$.

In accordance with at least some embodiments, the institute 115 may calculate the distance between two data points. For example, the institute 115 may calculate the $\Delta E$ for a first entity at graph coordinates 1402 and second entity at graph coordinates 1404.

In the current example, one skilled in the art would readily recognize that a difference in income values (represented by x), a difference in age values (represented by y), and a difference in debt values (represented by z) can be used to calculate a total distance between two entities ($\Delta E$). To alter the significance that each factor plays in this calculation, each attribute may be also assigned a weighted value according to its importance. In a simple example, using relative weight values a, b, and c:

$$\Delta E = \sqrt{(x^*a)^2 + (y^*b)^2 + (x^*c)^2}$$

In accordance with at least some embodiments, a $\Delta E$ may be calculated between a first entity located at coordinates 1404 and each of a plurality of cluster centroids in order to assign the entity to a centroid. In at least some of these embodiments, the cluster associated with the lowest $\Delta E$ for the entity may be assigned to that entity. Although a simple formula is presented, $\Delta E$ may be calculated using any distance calculation formula, including those developed to account for weighting of various relationships and/or outcome score values. One skilled in the art would readily recognize that several equivalent techniques are available for calculating a distance between two entities.

Figure 15:
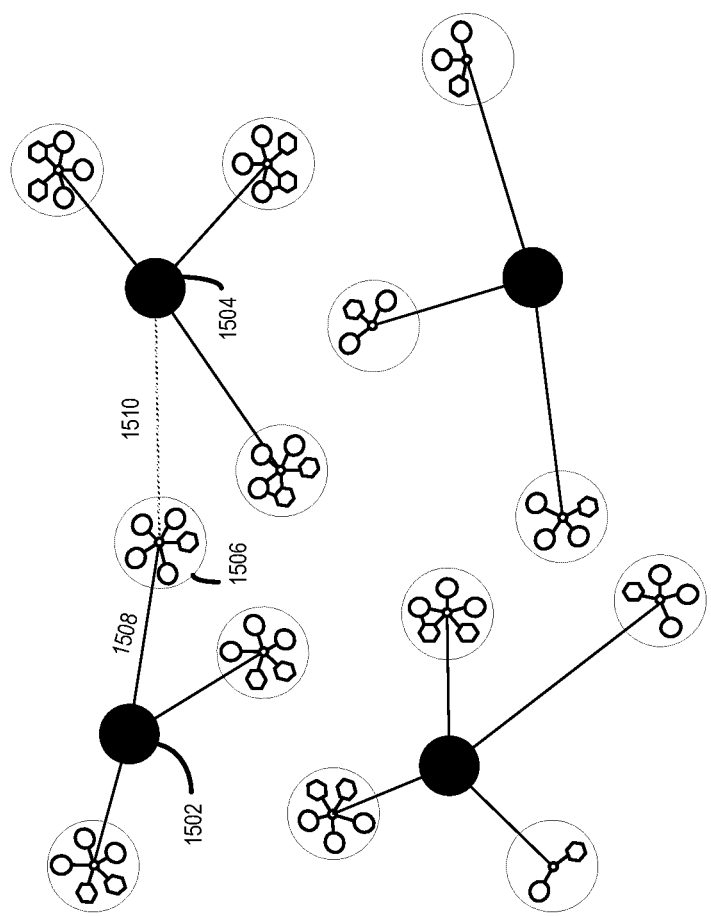
FIG. 15 depicts a graphical illustration of a networked-grouping clustering technique that may be implemented in accordance with at least some embodiments.

FIG. 15 depicts a graphical illustration of a networked-grouping clustering technique that may be implemented in accordance with at least some embodiments. It should be recognized that a multitude of clustering techniques are known and available (e.g., centroid-based clustering, distribution based clustering, connectivity based clustering, density based clustering, etc.). In implementing the current disclosure, one skilled in the art would recognize that multiple clustering techniques should be treated as equivalent. In FIG. 15 a centroid based clustering technique is depicted for description purposes.

In accordance with at least some embodiments, various networked-groupings may occupy a multi-dimensional space, with each dimension being associated with an attribute of the networked-grouping or an attribute of an element of the networked-grouping. Clustering techniques may be used to form clusters of networked-groupings within the multi-dimensional space. For example, in the current illustration, cluster centroids 1502 and 1504 have been placed in the multi-dimensional space as well. A centroid is a localized data point, not necessarily correlated to a data point within the dataset, that acts as a central point for a cluster. In the current example, a centroid may include attributes that are associated with networked-groupings, but is not necessarily a networked-grouping itself. The positional placement of cluster centroids within a space may utilize one or more known techniques, such as k-means clustering. In some embodiments, each networked-grouping is assigned to a cluster according to distance ($\Delta E$) from the cluster's centroid to the networked-grouping's center. For example, the institute 115 may evaluate networked-grouping 1506 with respect to centroids 1502 and 1504. In doing so, the institute 115 may calculate a vector distance 1508 from networked-grouping 1506 to centroid 1502. The institute 115 may also calculate a vector distance 1510 from networked-grouping 1506 to centroid 1504. When comparing the two, the institute 115 may determine that vector distance 1508 is shorter than vector distance 1510. Accordingly, the institute 115 may conclude that networked-grouping 1506 should be assigned to the cluster associated with centroid 1502.

It should be recognized that one advantage of clustering networked-groupings in the described manner is that similar networked-groupings can be identified without making a direct comparison between two networked-groupings. Because the networked-groupings in each cluster are substantially similar, outcome hazards and/or resource preferences associated with one networked-grouping are likely to be shared by other networked-groupings within the cluster. It should also be recognized that a number of techniques may be employed to increase this likelihood. For example, an increase to the number of centroids used (e.g., an increase in k used in a k-means clustering technique) will likely result in a decrease to the number of networked-groupings included in each cluster and an increase in the likelihood that the networked-groupings within a cluster are substantially similar. Likewise, including additional attributes (depicted as axes or dimensions in the current illustration) may result in an increased accuracy in identifying a cluster to which a networked-grouping belongs as well as a subsequent increase in the likelihood that the networked-groupings within each cluster are substantially similar. In accordance with at least some embodiments, a networked-grouping's association with a particular cluster may be manipulated altering a weighted value associated with each attribute, and subsequently affecting a $\Delta E$ between a networked-grouping and each cluster centroid. This is described in greater detail with respect to FIG. 15 above.

Figure 16:
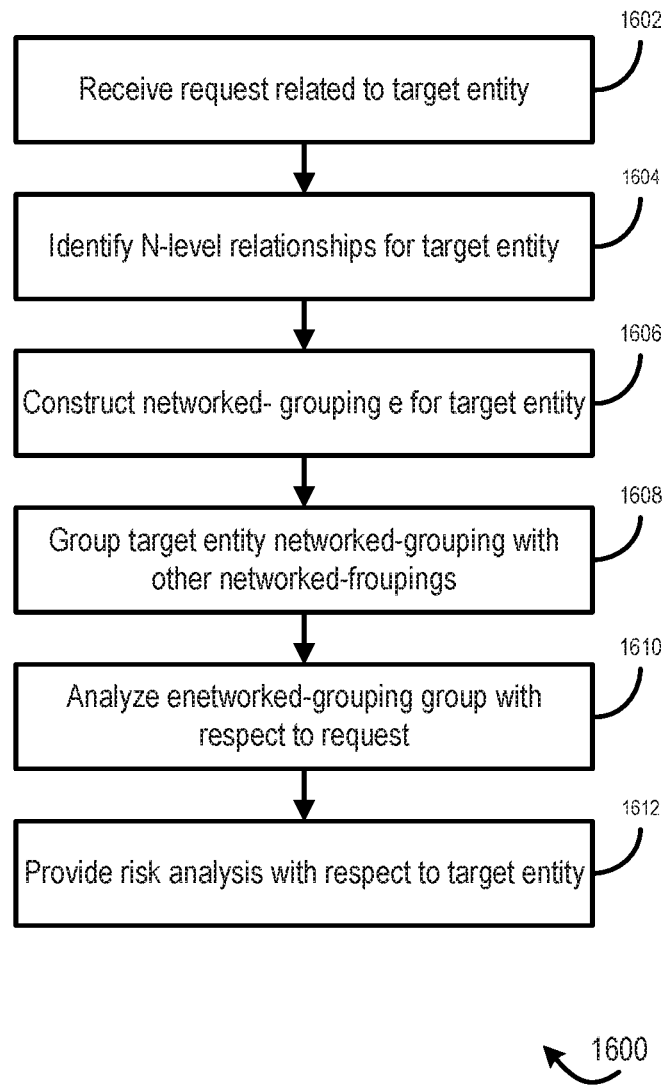
FIG. 16 depicts an illustrative flow diagram demonstrating an example process of assessing an outcome score for a resource requestor based on a networked-grouping to which the entity belongs in accordance with at least some embodiments.

FIG. 16 depicts an illustrative flow diagram demonstrating an example process of assessing an outcome score for an entity based on the networked-grouping to which the entity belongs in accordance with at least some embodiments. The process 1600 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 1600 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 1600 of FIG. 16 may be performed by at least the one or more institutes 115. The code may be stored on a computer-readable storage medium, for example, in the form of a computer program including a plurality of instructions executable by one or more processors. The computer-readable storage medium may be non-transitory.

Process 1600 may begin at 1602 when a request is received by a institute 115 related to a target entity. In generating a networked-grouping, the institute 115 may first identify a depth for the networked-grouping. An appropriate depth for a particular request may be indicated in a set of rules or a predetermined configuration and may vary based on the request. Once an appropriate depth is determined for the request, the institute 115 may identify entities and resources up to N relationship links from the target entity, whereas N is the determined depth. This may be done at step 1604 in process 1600. Each identified resource and entity may then be compiled into a networked-grouping for the target entity at 1606.

In some embodiments, the institute 115 may identify, based on the compiled networked-grouping, exposure outcome hazards related to the networked-grouping. To do this, the institute 115 may employ one or more valuation techniques in accordance with a set of rules for making valuations.

In some embodiments, the institute 115 may group or cluster networked-groupings according to similarities in relationship structures at 1608. A number of grouping/clustering techniques have been described in greater detail elsewhere in this disclosure. Once a grouping or cluster is identified for the networked-grouping associated with the target entity, other networked-groupings within the grouping may be analyzed at 1610.

Figure 17:
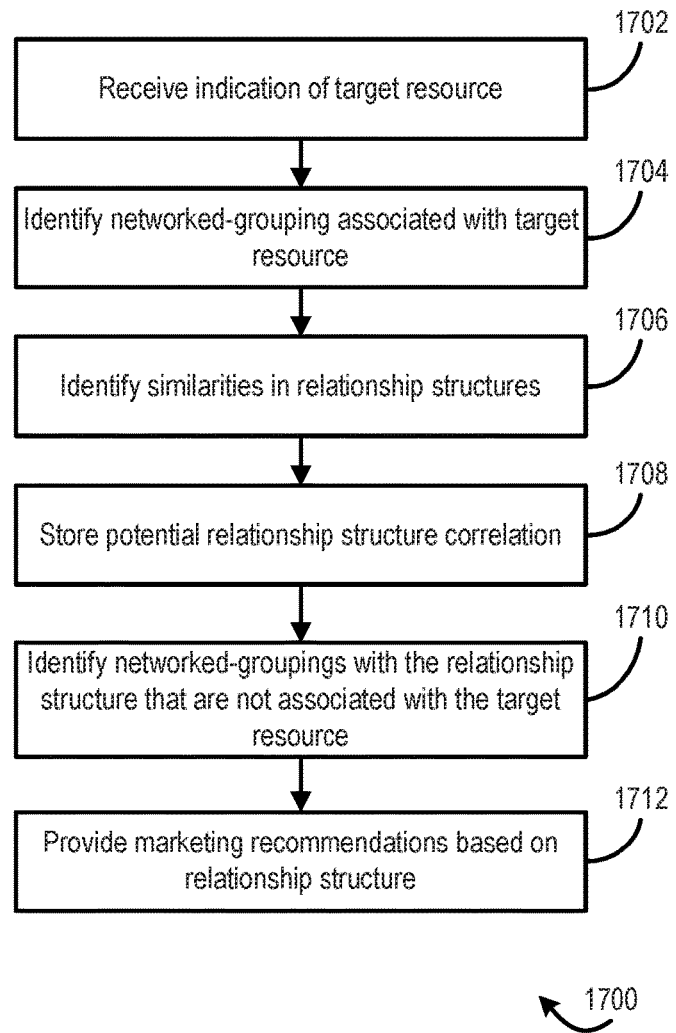
FIG. 17 depicts an illustrative flow diagram demonstrating an example process of identifying potential consumers of a resource based on relationship structures in accordance with at least some embodiments.

FIG. 17 depicts an illustrative flow diagram demonstrating an example process of identifying potential consumers of a resource based on relationship structures in accordance with at least some embodiments. The process 1700 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 1700 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 1700 of FIG. 17 may be performed by at least the one or more institutes 115. The code may be stored on a computer-readable storage medium, for example, in the form of a computer program including a plurality of instructions executable by one or more processors. The computer-readable storage medium may be non-transitory.

Process 1700 may begin at 1702 when an indication of a target resource is received. In response to receiving this request, the institute 115 may identify networked-groupings associated with the target resource at 1704. The institute 115 may then analyze the networked-groupings in order to identify potential correlations between the networked-groupings and the target resource. In some embodiments, the potential correlations may include relationship structures that are common to a large percentage of the networked-groupings identified at 1706. These particular relationship structures may be stored in association with the target resource at 1708.

In some embodiments, once a potentially correlated relationship structure has been identified for a target resource, the institute 115 may subsequently identify one or more networked-groupings having the relationship structure that are currently not associated with the resource at 1710. The one or more networked-groupings may be compiled into a new grouping or networked-grouping for analysis purposes. In these embodiments, the institute 115 may determine that at least one entity associated with the identified networked-groupings may be interested in the target resource. The institute 115 may subsequently provide a recommendation to the entity related to the target resource at 1712. In some embodiments, the recommendation may be provided via a notification to the entity's user device. In some embodiments, the recommendation may be provided to a reviewer so that the reviewer may proposed the target resource to the entity.

We fully incorporate by reference herein for all purposes the following:

U.S. Provisional Application No. 61/652,970, filed on May 30, 2012;

U.S. Provisional Application No. 61/652,977, filed on May 30, 2012;

U.S. Provisional Application No. 61/714,647, filed on Oct. 16, 2012;

U.S. Provisional Application No. 61/792,011, filed on Mar. 15, 2013;

U.S. Provisional Application No. 62/032,239, filed on Aug. 1, 2014;

U.S. Provisional Application No. 62/047,474, filed on Sep. 8, 2014,

U.S. Provisional Application No. 62/102,196, filed on Jan. 12, 2015;

U.S. Provisional Application No. 62/187,487, filed on Jul. 1, 2015;

U.S. patent application Ser. No. 14/713,899 filed on May 15, 2015;

U.S. patent application Ser. No. 14/848,119 filed on Sep. 8, 2015,

U.S. patent application Ser. No. 14/993,328 filed on Jan. 12, 2016,

U.S. patent application Ser. No. 15/017,339 filed on Feb. 5, 2016,

U.S. Pat. No. 9,268,819 issued Feb. 23, 2016,

U.S. Pat. No. 9,098,875 issued Aug. 4, 2015;

U.S. Pat. No. 9,082,151 issued Jul. 14, 2015;

U.S. Pat. No. 8,762,376 issued Jun. 24, 2014; and

U.S. Pat. No. 8,572,083 issued Oct. 29, 2013.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments. It is also the case that modules, software, or algorithms can be performed on one server, multiple servers or share the same server. A platform is a major piece of software, such as an operating system, an operating environment, or a relational database or data store, under with various smaller application programs can be designed to run. An operating system is the most important software program running on most computer systems. It manages a processors memory, processes, all of the software and programs loaded onto it, and all of the connected hardware. The operating system's job is to manage all of the software and hardware on the computer. Most of the time, there are many different software programs operating at once as well as multiple connected hardware devices. There are many operating systems—the most basic is the disk operating system or "DOS." Each type of computer or device typically has its own different operating systems. Some typical operating systems are iOS, Windows, Android, and Linux.

The networks disclosed may be implemented in any number of topologies. A network is made of many computing devices that can include computers, servers, mainframe computers, network devices, peripherals, or other devise connected together. A network allows these devices to share data and communicate with each other. The most prominent network is the Internet—that connects billions of devices all over the world. There are many types of network devices including: computers, consoles, firewalls, hubs, routers, smartphones, switches, wearables, watches, and cameras. Networks are set up in many different ways referred to as network topologies. Some of the most common topologies include tree, hybrid, ring, mesh star, and bus. The tree topology is the generally used topology. A computer is typically an electronic device for storing and processing data according to instruction it reads. A console is a text entry and display device. A firewall is network security system, either hardware- or software-based, that controls incoming and outgoing network traffic based on a set of rules, and acts as a barrier between a trusted network and other untrusted networks—such as the Internet—or less-trusted networks—a firewall controls access to the resources of a network through a positive control model. This means that the only traffic allowed onto the network defined in the firewall policy is; all other traffic is denied. A hub is a connection point for multiple devices in a network. A hub typically has multiple ports such that if packets of data arrive at one port they are copied to the other ports. A router is a device that forwards data packets along the network. A router connects two or more networks such as an intranet to the internet. Routers use headers and forwarding tables to determine how data packets should be sent using certain paths in the network. The typical router protocol using ICMP to communicate and configure the best path. A network switch is different from a router. Switches serve as controllers that enable networked devices to communicate with each other. Switches create networks while routers connect networks together.

Networks operate on the seven layer open system interconnection (OSI) model. The OSI model defines a conceptual networking framework to implement protocols and divides the task of networking into a vertical stack of the seven layers. In the OSI model, communication control is passed through the layers from the first to the seventh layer. The first or "top" layer is the "physical" layer. Layer 1 transmits the bit stream of ones and zeros indicated by electrical impulse, light, or radio frequency signals—thus providing a method of interacting with actual hardware in a meaningful way. Examples of the physical layer include Ethernet, FDDI, B8ZS, V.35, V.24, and RJ45. The second layer is called the Data Link layer. At layer 2 data packets are encoded and decoded into a bit stream in compliance with transmission protocols that control flow control and frame synchronization. The Data Link layer 2 is actually a combination of two different layers: the Media Access Control (MAC) layer and the Logical Link Control (LLC) layer. The MAC layer controls a computer's access to the network. The LLC basically controls frame synchronization, flow control, and various types of error correction. Examples of the Data Link layer include PPP, FDDI, ATM, IEEE 802.5/802.2, IEEE 802.3/802.2, HDLC, and Frame Relay. The third OSI layer, called the "Network" layer, provides the switching and routing technology to create logical paths to transmit data from one node to another in the network. Layer. The Network layer also performs the function of routing, forwarding, addressing, internetworking, error handling, congestion control, and packet sequencing. Layer 3 examples include AppleTalk, DDP, IP, and IPX. The fourth OSI layer is the Transport layer. Layer 4 provides transparent transfer of data between devices. Layer 4 also performs error recovery and provides flow control for complete data transfer. Examples of layer 4 include SPX, TCP, and UDP. OSI layer 5 called the Session layer because it manages and terminates the connections between different applications. The Session layer coordinates communication between applications. It sets up communications and terminates the communications between applications at each end—establishing and ending a "session." Examples include NFS, NetBios, names, RPC, and SQL. Layer 6 is called the Presentation Layer. Layer 6 is really the "transformation" layer—transforming data from the final layer to a format the network understands and vice versa. Layer 6 formats and encrypts data sent on the network and decrypts the data from the network. Examples include ASCII, EBCDIC, TIFF, GIF, PICT, JPEG, MPEG, and MIDI. Finally, the last layer 7, is called the Application Layer. Everything at this layer is specific to applications, and this layer provides the services for email, file transfers, and other network applications. Examples include WWW browsers, NFS, SNMP, FTP, Telnet, and HTTP.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), complex instruction set computers (CISCs), reduced instruction set computers (RISCs), advanced RISC machines (ARMs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. A processor is implemented in logic circuitry that includes the basic functions of AND, NAND, OR, and NOR functions. The circuitry responds to the basic instructions that operate an computing device. In some computing devices the processor is actually referred to a as microprocessor. Functionally, processors are typically composed of RAM as well as address and data buses, the processing circuitry and accumulators. The busses supply the data and programming instructions from RAM, ROM, CACHE, or other memory to the processing circuitry. The speed of a processor depends both on the speed of the processing circuitry as well as the speed of the data and address busses that supply the circuitry. And the speed of the data and address buses are also gated by the speed of the RAM. It is critical that all of these components have speeds that are matched to one another to maximize processor performance. Processors use machine level instruction codes to manipulate data. Other instructions must be compiled to machine level instructions to for the processor to perform the operations. Dual core processors have dual processing circuitry and multiple address and data buses.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data. Cache memory, also called the central processing unit (CPU) memory, is random access memory that the processor can access more quickly than standard RAM. Cache memory is typically integrated into the circuitry with the processing unit, but sometimes can be placed on a separate chip. The principle purpose of cache memory is to store the program instruction for the operational software such as an operating systems. Most long running software instructions reside in cache memory if they are accessed often.

While the principles of the disclosure have been described above in connection with specific apparatuses and methods, it is to be clearly understood that this description is made only by way of example and not as limitation on the scope of the disclosure.

What is claimed is:

1. A system for computing an outcome score associated with fulfilling a request for a first financial services product, the system comprising:
    a linking processor connected to a financial services product provider device over a network that, in response to receiving the request for the first financial services product from a financial services product requestor device:
        configures an interconnect web to include a plurality of nodes and a plurality of links interconnecting the plurality of nodes, wherein each node of the plurality of nodes corresponds to an entity that is a person, business, or organization;
        identifies a first link between a first node that corresponds to a first entity and a requestor node that corresponds to a financial services product requestor, wherein the first link represents a first existing relationship between the first entity and the financial services product requestor, and wherein the first entity is a first person, business, or organization,
        identifies a second link between a second node that corresponds to a second entity and the requestor node that corresponds to the financial services product requestor, wherein the second link represents a second existing relationship between the second entity and the financial services product requestor, and wherein the second entity is a second person, business, or organization; and
        identifies a first networked grouping within the interconnect web, wherein the first network grouping associates the first node, the second node, and the requestor node;
    a cluster module that identifies a second networked grouping within the interconnect web, wherein the second networked grouping comprises a receiver node that corresponds to a recipient of a second financial services product, a third node that corresponds to a third entity, and a fourth node that corresponds to a fourth entity; and
    an outcome score module that:
        determines a first score of the first entity as a function of the first link and the first financial services product;
        determines a second score of the second entity as a function of the second link and the first financial services product;
        determines a third score based on at least one default rate of the second networked grouping;
        calculates a first weight as a function of the first link;
        calculates a second weight as a function of the second link;
        generates the outcome score as a function of the first score, the second score, the third score, the first weight, and the second weight, wherein the outcome score is a measure of a level of risk of a resource provider providing the first financial services product to the financial services product requestor; and
        causes, over the network, the outcome score to be displayed on the financial services product provider device, wherein the financial services product provider device causes, over the network, a response to appear on the financial services product requestor device.

2. The system of claim 1, wherein the outcome score module:
    calculates a third weight as a function of the financial services product requestor and the first financial services product; and
    generates the outcome score as a function of the first score, the second score, the third score, the first weight, the second weight, and the third weight.

3. The system of claim 1, wherein:
    the second financial services product is determined to be similar to the first financial services product.

4. The system of claim 1, wherein:
    the second networked grouping has a link determined to be similar to the first link.

5. The system of claim 1, wherein the outcome score module generates an initial outcome score as a function of the first score, the second score, the first weight, and the second weight, and subsequently generates the outcome score as a function of the initial outcome score and the third score.

6. The system of claim 4, further comprising:
    a financial services product placement module that:
        determines that the third entity corresponding to the third node in the second networked grouping lacks a first financial services product type; and
        causes, over the network, a message to appear on the financial services product provider device that the third entity lacks the first financial services product type, wherein the financial services product provider device causes, over the network, an offer of the first financial services product to appear on a third entity device.

7. A processor-implemented method for computing an outcome score associated with fulfilling a request for a first financial services product, the method comprising:
    receiving, over a network, the request for the first financial services product, from a financial services product requestor device;
    configuring an interconnect web to include a plurality of nodes and a plurality of links interconnecting the plurality of nodes, wherein each node of the plurality of nodes corresponds to an entity that is a person, business, or organization;
    identifying a first link between a first node that corresponds to a first entity and a requestor node that corresponds to a financial services product requestor, wherein the first link represents a first existing relationship between the first entity and the financial services product requestor, and wherein the first entity is a first person, business, or organization;
    identifying a second link between a second node that corresponds to a second entity and the requestor node that corresponds to the financial services product requestor, wherein the second link represents a second existing relationship between the second entity and the financial services product requestor, and wherein the second entity is a second person, business, or organization;

determining a first score of the first entity as a function of the first link and the first financial services product;

determining a second score of the second entity as a function of the second link and the first financial services product;

calculating a first weight as a function of the first link;

calculating a second weight as a function of the second link;

identifying a first networked grouping within the interconnect web, wherein the first networked grouping associates the first node, the second node, and the requestor node;

identifying a second networked grouping within the interconnect web, wherein the second networked grouping comprises a receiver node that corresponds to a recipient of a second financial services product, a third node that corresponds to a third entity, and a fourth node that corresponds to a fourth entity;

determining a third score based on at least one default rate of the second networked grouping;

generating the outcome score as a function of the first score, the second score, the third score, the first weight, and the second weight, wherein the outcome score is a measure of a level of risk of a resource provider providing the first financial services product to the financial services product requestor; and causing, over the network, the outcome score to be displayed on a financial services product provider device, wherein the financial services product provider device causes, over the network, a response to appear on the financial services product requestor device.

8. The processor-implemented method of claim 7, further comprising:

calculating a third weight as a function of the financial services product requestor and the first financial services product; and generating the outcome score as a function of the first score, the second score, the third score, the first weight, the second weight, and the third weight.

9. The processor-implemented method of claim 7,
wherein the second financial services product is determined to be similar to the first financial services product.

10. The processor-implemented method of claim 7,
wherein the second networked grouping has a link determined to be similar to the first link.

11. The processor-implemented method of claim 7, wherein an initial outcome score is generated as a function of the first score, the second score, the first weight, and the second weight, and the outcome score is subsequently generated as a function of the initial outcome score and the third score.

12. The processor-implemented method of claim 10, further comprising:

determining that the third entity corresponding to the third node in the second networked grouping lacks a first financial services product type; and causing, over the network, a message to appear on the financial services product provider device that the third entity lacks the first financial services product type, wherein the financial services product provider device causes, over the network, an offer of the first financial services product to appear on a third entity device.

13. A non-transitory computer readable medium having instruction sets stored thereon that, when the instruction sets are executed by a computer, the instruction sets cause the computer to:

receive, over a network, a request for a first financial services product, from a financial services product requestor device, by a financial services product provider device;

configure an interconnect web to include a plurality of nodes and a plurality of links interconnecting the plurality of nodes, wherein each node of the plurality of nodes corresponds to an entity that is a person, business, or organization;

identify a first link between a first node that corresponds to a first entity and a requestor node that corresponds to a financial services product requestor, wherein the first link represents a first existing relationship between the first entity and the financial services product requestor, and wherein the first entity is a first person, business, or organization, and identify a second link between a second node that corresponds to a second entity and the requestor node that corresponds to the financial services product requestor, wherein the second link represents a second existing relationship between the second entity and the financial services product requestor, and wherein the second entity is a second person, business, or organization;

determine a first score of the first entity as a function of the first link and the first financial services product;

determine a second score of the second entity as a function of the second link and the first financial services product;

calculate a first weight as a function of the first link;

calculate a second weight as a function of the second link;

identify a first networked grouping within the interconnect web, wherein the first networked grouping associates the first node, the second node, and the requestor node;

identify a second networked grouping within the interconnect web, wherein the second networked grouping comprises a receiver node that corresponds to a recipient of a second financial services product, a third node that corresponds to a third entity, and a fourth node that corresponds to a fourth entity;

determine a third score based on the second networked grouping;

generate an outcome score as a function of the first score, the second score, the third score, the first weight, and the second weight, wherein the outcome score is a measure of a level of risk of a resource provider providing the first financial services product to the financial services product requestor; and cause, over the network, the outcome score to be displayed on the financial services product provider device, wherein the financial services product provider device causes, over the network, a response to appear on the financial services product requestor device.

14. The non-transitory computer readable medium of claim 13, wherein wherein the second financial services product is determined to be similar to the first financial services product.

15. The non-transitory computer readable medium of claim 13, wherein the second networked grouping has a link determined to be similar to the first link.

16. The non-transitory computer readable medium of claim 13, wherein, when the instruction sets are executed by the computer, the instruction sets cause the computer to generate an initial outcome score as a function of the first score, the second score, the first weight, and the second weight, and to subsequently generate the outcome score as a function of the initial outcome score and the third score.

17. The non-transitory computer readable medium having instruction sets stored thereon of claim 15, wherein, when the instruction sets are executed by the computer, the instruction sets cause the computer to:
   determine that the third entity corresponding to the third node in the second networked grouping lacks a first financial services product type; and
   cause, over the network, a message to appear on the financial services product provider device that the third entity lacks the first financial services product type, wherein the financial services product provider device causes, over the network, an offer of the first financial services product to appear on a third entity device.

* * * * *